(12) United States Patent
Franco

(10) Patent No.: US 9,930,959 B2
(45) Date of Patent: Apr. 3, 2018

(54) MODULAR FURNITURE AND STRUCTURES

(71) Applicant: Comsero, Inc., Broomfield, CO (US)

(72) Inventor: Anthony Franco, Broomfield, CO (US)

(73) Assignee: Comsero, Inc., Broomfield, CO (US)

( * ) Notice: Subject to any disclaimer, the term of this patent is extended or adjusted under 35 U.S.C. 154(b) by 8 days.

(21) Appl. No.: 15/231,597

(22) Filed: Aug. 8, 2016

(65) Prior Publication Data

US 2017/0035197 A1 Feb. 9, 2017

Related U.S. Application Data

(60) Provisional application No. 62/202,427, filed on Aug. 7, 2015.

(51) Int. Cl.
*A47B 47/00* (2006.01)
*F16B 12/20* (2006.01)
(Continued)

(52) U.S. Cl.
CPC ...... *A47B 47/0091* (2013.01); *A47B 47/0066* (2013.01); *A47B 47/0075* (2013.01);
(Continued)

(58) Field of Classification Search
CPC ............ A47B 47/0066; A47B 47/0075; A47B 47/0091; A47B 87/007; A47B 87/008;
(Continued)

(56) References Cited

U.S. PATENT DOCUMENTS 2,364,083 A * 12/1944 Lindsay ................... B65D 7/32
220/683
2,582,553 A 1/1952 McMurtie
(Continued)

FOREIGN PATENT DOCUMENTS

DE 19949849 2/2001
EP 1022968 8/2000
WO WO 1987/000406 1/1987

OTHER PUBLICATIONS

"Top 10 Sources for Modular Furniture," Apartment Therapy, retrieved from http://www.apartmenttherapy.com/top-10-sources-for-modular-furniture-208177, retrieved Jul. 22, 2015, 4 pages.
(Continued)

*Primary Examiner* — Daniel J Troy
*Assistant Examiner* — Kimberley S Wright
(74) *Attorney, Agent, or Firm* — Sheridan Ross P.C.

(57) ABSTRACT

Embodiments of the present invention generally relate to furniture, housing and office accessories, and interior design. More specifically, embodiments of the invention relate to modular furniture, modular structures, a modular furniture system, and a modular unit for use in the modular furniture, the modular structures, the modular furniture system, and an interior design system. In some embodiments, the modular furniture system comprises a plurality of modular units that can be interconnected to one another to form furniture and other structures. Each modular unit comprises a plurality of side members interconnected to one another using connectors. The connectors can also be used to interconnect one modular unit to another modular unit.

15 Claims, 11 Drawing Sheets

(51) Int. Cl.
*A47B 47/04* (2006.01)
*F16B 12/46* (2006.01)
*F16B 12/12* (2006.01)
*E04H 3/10* (2006.01)
*F16B 12/44* (2006.01)

(52) U.S. Cl.
CPC ............. *A47B 47/042* (2013.01); *E04H 3/10* (2013.01); *F16B 12/125* (2013.01); *F16B 12/20* (2013.01); *F16B 12/46* (2013.01); *F16B 12/44* (2013.01)

(58) Field of Classification Search
CPC .......... F16B 12/50; F16B 12/46; F16B 12/04; F16B 2012/043; F16B 12/20; F16B 12/26; F16B 12/36; F16B 12/38; F16B 12/44; F16B 12/125; F16B 2012/046; F16B 2012/466; Y10T 403/342; Y10T 403/347
See application file for complete search history.

(56) References Cited

U.S. PATENT DOCUMENTS

| | | | |
|---|---|---|---|
| 3,234,896 A | 2/1966 | Bonsall | |
| 3,644,008 A | 2/1972 | Overby | |
| 3,661,434 A * | 5/1972 | Alster | A47B 47/005 312/108 |
| 3,722,704 A * | 3/1973 | Piretti | A47B 47/0041 211/183 |
| 3,811,728 A | 5/1974 | Redemske | |
| 3,822,924 A * | 7/1974 | Lust | A47B 47/0041 312/108 |
| 3,836,217 A | 9/1974 | Shiina | |
| 3,836,218 A * | 9/1974 | Hallal | A47B 47/0041 312/108 |
| 3,885,845 A | 5/1975 | Krieks | |
| 3,909,914 A * | 10/1975 | Symons | A47B 47/00 108/158.12 |
| 4,279,455 A * | 7/1981 | Santo | A47B 88/00 312/140 |
| 4,840,440 A * | 6/1989 | Dieter | F16B 12/46 217/65 |
| 5,466,058 A * | 11/1995 | Chan | A47B 47/0075 312/107 |
| 5,477,594 A * | 12/1995 | LePage | E04H 13/006 211/194 |
| 5,482,396 A * | 1/1996 | Guillemet | E06B 3/5892 403/381 |
| 5,588,726 A | 12/1996 | Lee | |
| 6,179,515 B1 * | 1/2001 | Grieser | F16B 12/46 403/381 |
| 8,113,600 B2 * | 2/2012 | Zalewski | A47B 47/0041 312/107 |
| 8,186,776 B2 * | 5/2012 | Zalewski | A47B 47/0041 312/107 |
| 9,078,515 B2 | 7/2015 | Keragala | |
| 9,217,450 B2 * | 12/2015 | Pettigrew | A47B 47/042 |
| 9,414,985 B2 * | 8/2016 | Ugartechea Berlanga | A61G 99/00 |
| 9,655,442 B2 * | 5/2017 | Boo | A47B 47/0075 |
| 9,726,210 B2 * | 8/2017 | Derelov | F16B 12/46 |
| 2005/0104483 A1 * | 5/2005 | Saravis | A47B 47/0033 312/111 |
| 2006/0250052 A1 | 11/2006 | Davis et al. | |
| 2009/0224642 A1 * | 9/2009 | Murphy | A47B 95/008 312/263 |
| 2011/0241505 A1 * | 10/2011 | Tashjian | A47B 87/0276 312/198 |
| 2015/0308141 A1 * | 10/2015 | Ugartechea Berlanga | E04H 13/008 52/135 |
| 2017/0227035 A1 * | 8/2017 | Fridlund | F16B 12/22 |
| 2017/0234346 A1 * | 8/2017 | Fridlund | F16B 12/22 29/428 |

OTHER PUBLICATIONS

"Modular BUILD Blocks Can be Stacked Up to Create Flexible Shelving," BUILD, retrieved from http://inhabitat.com/modular-build-blocks-can-be-stacked-up-to-create-flexible-shelving/, retrieved Jul. 22, 2015, 2 pages.
"christian sjöström develops link modular furniture system," Christian Sjöström, 2015, retrieved from http://www.designboom.com/design/link-furniture-christian-sjostrom-03-24-2015, 12 pages.
"The ReStyle Modular Coffee Table is Perfect for Compact Spaces," James Howlett, 2010, retrieved from http://inhabitat.com/the-re-style-modular-coffee-table-is-perfect-for-compact-spaces, 2 pages.
Modular 'Make Any Furniture Yourself' System Uses Loose Joints, Joscha Weiand, 2012, retrieved from http://treehugger.com/modular-design/loose-joints-modular-furniture-system-joscha-weiand.html, 4 pages.
"Customizable, Downloadable DIY Dutch Furniture by Minale-Maeda," Minale-Maeda, 2011, retrieved from http://www.treehugger.com/sustainable-product-design/customizable-downloadable-furniture-minale-maeda.html, 4 pages.
"Stackable ModCubes Make Building Lets Your Build Furniture in a Snap," ModRoomz, 2013, retrieved from http://inhabitat.com/new-post-submission-735/, 2 pages.
"To Gather sofa's," product sheet, Studio Lawrence, retrieved from www.studiolawrence.com, retrieved on Jul. 22, 2015, 5 pages.
"Modular Furniture Designed By You, For You!" TETRAN, 2012, retrieved from http://tetranliving.com, 3 pages.
"Dsquadro's Modular JOIN System Can be Used to Create Virtually any Kind of Furniture," 2012, retrieved from http://inhabitat.com/dsquadros-modular-join-system-can-be-used-to-create-virtually-any-kind-of-furniture/, 2 pages.
"ModRoomz. Eco-friendly, Reconfigurable Modular furniture for Modern Living," 2014, retrieved from https://www.indiegogo.com/projects/modroomz-eco-friendly-reconfigurable-modular-furniture-for-modern-living#/story, 13 pages.
"Rearrangeable Magnetic Block Furniture is Like Your Own Fancy Life-Sized Lego Set," Paul Kelley, 2014, retrieved from http://inhabitat.com/cubic-copper-clad-furniture-assembles-magnetically-at-the-london-design-festival/paul-kelley3/?extend=1, 3 pages.
"TETRAN's Eco-friendly Modular Cubes Can Be Arranged Into Almost Design," 2012, retrieved from http://inhabitat.com/tetrans-eco-friendly-modular-cubes-can-be-arranged-into-almost-design/, 2 pages.

* cited by examiner

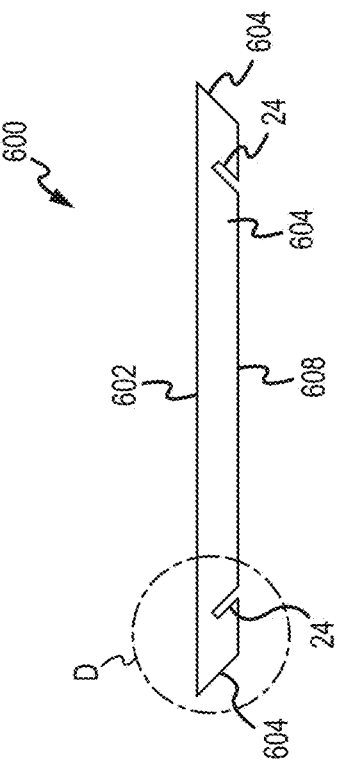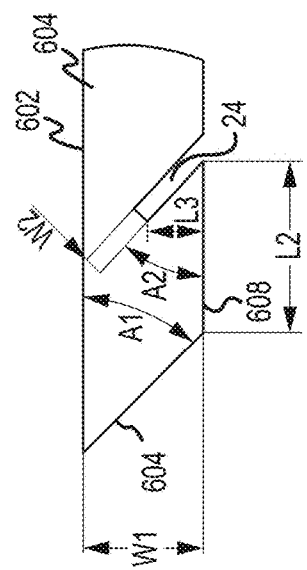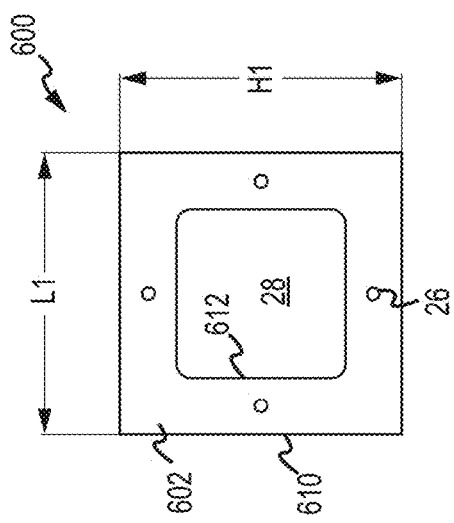

ant_MODULAR FURNITURE AND STRUCTURES

RELATED APPLICATIONS

This Application claims the benefit of U.S. Provisional Patent Application Ser. No. 62/202,427, filed Aug. 7, 2015, entitled "Modular Furniture and Structures," which is hereby incorporated by reference in its entirety.

FIELD OF THE INVENTION

Embodiments of the present invention generally relate to furniture, housing and office accessories, and interior design. More specifically, embodiments of the invention relate to modular furniture, modular structures, a modular furniture system, and a modular unit for use in an interior design system.

BACKGROUND OF THE INVENTION

The art of furniture design and construction has evolved rather rapidly over the last half century. A variety of shapes and sizes of furniture have been developed to provide comfort and decoration. Traditional furniture has been used to furnish homes, offices, and other commercial establishments for many years. Traditional furniture is typically made in a number of different styles, using a variety of materials, and finished with a variety of surface finishes. One feature of traditional furniture is that traditional furniture comes completely assembled from the furniture manufacturer, and once the item of furniture has been made it cannot be otherwise modified, sized, or tailored to suit the purchaser or the environment in which the furniture is to be used.

Alternatively, some modern furniture is sold as a kit with all of the furniture pieces and the purchaser must assemble the furniture using screws or other connecting mechanisms. Thus, the purchaser purchases an unfinished furniture kit that contains all of the necessary pieces to assemble a piece of furniture and then the purchaser assembles the furniture herself. These furniture kits seems to suit the mobility factor of certain segments of our society due to the fact that the furniture can be easily disassembled for compact storage and for moving and then readily reassembled in a new residence, office, or other environment. However, similar to the traditional furniture, the modern furniture pieces can only be assembled in one way to make a specific piece of furniture that is a predetermined size, shape, and color. The modern furniture kit comes with the exact number of pieces needed to build the furniture item. Thus, a purchaser cannot assemble the furniture kit in different ways or use different pieces to create different furniture items or furniture of different sizes, shapes, and colors.

There are a few known examples of modular furniture systems. For example, U.S. Pat. No. 2,582,553 to McMurtrie, which is incorporated by reference herein in its entirety, discloses sectional toy furniture designed for children's amusement and intellectual development. The toy furniture consists of toy building blocks formed by panels that are fixed to skeleton frames. The blocks are interconnected by rubber pins that fit into a pair of sockets positioned on diagonally opposite corners of the panels.

U.S. Pat. No. 3,811,728 to Redemske, which is incorporated by reference herein in its entirety, discloses plastic modular furniture formed with individual molded plastic base and storage modules having a plurality of grooves on the top surface. The modular furniture further includes a plurality of shells for sitting, sleeping, storage, and table tops having a peripheral ridge suitable for engaging the plurality of grooves on the base module. The base modules are connected together by a plurality of flexible clips that fit into a plurality of slots provided in each base module.

U.S. Patent Application Publication No. 2006/0250052 to Davis et al., which is incorporated by reference herein in its entirety, discloses a modular storage system and a method of assembling the system. Each modular storage component includes a first end provided with an integral connector and a second end (opposite the first end) adapted to engage a second modular component at and engage with an integral connector of the second component.

U.S. Pat. No. 9,078,515 to Keragala ("Keragala"), which is incorporated by reference herein in its entirety, discloses an interior design unit for use in an interior design system, the interior design unit including a modular unit (or cell) comprising four, five, or six planar members, each planar member having a tetragonal shape and being removably attached to at least one other planar member. Additionally, each of the planar members includes a plurality of through holes for receiving a connector for attachment to at least one other interior design unit, and each through hole is positioned at a substantially equal distance from an adjacent corner of the planar member. In a preferred embodiment of Keragala, each planar member includes four through holes. The interior design system also includes a plurality of modular units and at least one connector for removably attaching one modular unit to one other modular unit.

Known modular furniture systems and furniture kits suffer from a number of disadvantages and drawbacks. For example, the modular furniture has generally been rather plain in design and appearance and incapable of providing a variety of choices such as choices in furniture designs, shapes, material selections, colors, and the like. Additionally, the prior art furniture kits are usually constructed to form traditional pieces of furniture once assembled, and do not allow for any degree of flexibility in assembly, shape, size, color, or the ability to be readily modified into other pieces of furniture for use in a house, an office, or other environments. Therefore, known modular furniture systems and furniture kits have little or no utility apart from their use in the primary combinations for which they are designed and intended.

In many modular furniture arrangements and kits of the prior art, assembly of the sections, pieces, or modules requires complex securing or fastening devices, and thus often requires special knowledge and skills for assembling the components. Alternatively, these systems and kits require numerous screws, nails, or other securing, fastening, or interconnecting mechanisms. Thus, these systems and kits take a long time to assemble because so many securing, fastening, or interconnecting mechanisms are needed and/or because the instructions for assembling these systems and kits include numerous steps and often complicated steps. Also, the various modules or elements are usually visibly connected to other modules or elements rather than presenting a finished appearance replicating furniture manufactured as a single unitary piece. On the other hand, if the interconnecting or fastening devices are sufficiently obscured to give the modular furniture or kit a solid, unitary appearance, the individual modules or pieces cannot be easily separated or disassembled or reconnected for alternative uses of the furniture.

Still another problem encountered with many known modular systems is that such systems typically receive extensive use, and often only a few pieces or components receive extensive use, which causes various elements of the system to become worn out or damaged, thus requiring expensive repair or replacement of large portions of the modular units. Particularly prone to such wear and tear is the upholstery, which receives direct contact and is more easily damaged than other portions and other materials.

SUMMARY OF THE INVENTION

Accordingly, various embodiments of the present invention provide a modular furniture system that overcomes these problems and disadvantages. Due to the numerous limitations associated with the prior art described above, the following disclosure describes an improved modular furniture system that employs various novel features, including novel interconnection features.

These and other needs are addressed by the various embodiments and configurations of the present invention. Specifically, a modular furniture system is desired that is versatile, durable, relatively inexpensive, and easy to assemble, disassemble, interconnect, disconnect, and change finishes.

Thus, it is one aspect of embodiments of the present invention to provide a modular furniture and structure system that can be easily assembled and disassembled by a consumer, without requiring special knowledge, special tools, or expensive equipment. Embodiments of the present invention incorporate a plurality of basic modular units that when combined form a plurality of working, seating, sleeping, and storage facilities. The component nature of the system enables one to form a great variety of unique furniture by simply rearranging the modular units. In some embodiments, the individual modules comprise at least one base, seating portion, top surface, storage unit, cushion, outer surface, and shelf. It is the combination of these modular units that form the working, seating, storage, and sleeping systems.

Another aspect of embodiments of the present invention is to provide modular furniture and structures that enable a person to create a plurality of different furniture pieces from the same basic modular units without the necessity of cumbersome tools, fasteners, or the like. It is another aspect of embodiments of the present invention to provide a modular furniture and structure system that is flexible such that it can be easily assembled into a wide variety of interior design or furniture units that can be used in any residential or commercial space.

One aspect of embodiments of the invention is to provide a plurality of modular units that can easily be transposed into one of a plurality pieces of furniture for working, sitting, sleeping, or storage. A further aspect of embodiments of the invention is to provide a versatile, inexpensive means for creating a plurality of different furniture pieces from the same modular units.

It is one aspect of embodiments of the present invention to provide a modular furniture system comprised of modular units that can be interchanged with one another to form a plurality of sitting, sleeping, and storage structures. Thus, modular furniture comprised of individual modules that can be formed into a variety of furniture items enables a person to furnish his home, garage, or office inexpensively. Additionally, when he wants to change or update the modular furniture in any way, he only has to recombine or rearrange his existing modular elements into a new arrangement of different pieces and add new finishing elements.

Another aspect of embodiments of the present invention is to provide modular furniture and structures comprised of modular units of varying sizes that can be assembled in various ways to form useful structures and furniture well suited to serve a wide variety of residential, commercial, and workroom purposes. Thus, the modular units can be used to create tables, chairs, couches, cabinets, raised floors, temporary walls, desks, multi-shelved units, work benches, pedestals, beds, dressers, and many other kinds of functional installations.

A further aspect of embodiments of the present invention is to provide modular furniture and structures that are aesthetically pleasing and are available in a variety of finishes, materials, textures, and patterns. Additionally, the visible portions of the modular furniture and structures are easily replaceable and interchangeable, which allows for easy updating and revamping.

One aspect of embodiments of the present invention is to provide a modular furniture system comprised of modular units, where each modular unit can be disassembled and reassembled with relative ease. In one embodiment, each modular unit is comprised of four or more panels, also called side members or planar members herein. Each side member is substantially planar and/or substantially flat. Thus, the side member has a substantially uniform thickness in some embodiments. Further, the top surface (also called the "upper surface" or "outer surface" herein) of the side member may be substantially flat and the bottom surface (also called the "lower surface" or "inner surface" herein) of the side member may also be substantially flat. In alternate embodiments, some side members are curved.

In one embodiment, each side member has a substantially flat outer surface, a substantially flat inner surface that is opposite to and substantially parallel to the outer surface, and three or more side surfaces positioned between the outer perimeter of the outer surface and the outer perimeter of the inner surface. In some embodiments, the side surfaces are positioned at about a 45-degree angle relative to the outer surface and inner surface. Further, when the side members are interconnected to one another to form a modular unit, one side surface of one side member is positioned adjacent to and/or in direct contact with one side surface of a second side member. Thus, if the side member has four side surfaces, then each side surface of the first side member can be positioned adjacent to one side surface of four other side members to form a box or cube-shaped modular unit.

One aspect of the present invention is to provide modular furniture with light-weight components. Accordingly, in various embodiments, each side member can be solid piece of light-weight material or have a frame-like shape with a cutout or hole in the center of the side member to reduce the weight of the side member and improve handlability. In some embodiments, the side members are a tetragonal shape and may be rectangular or square shaped or a quadrilateral shaped panel. Thus, the side member may have a first edge or side that is substantially parallel to a second edge or side positioned opposite the first edge or side. Additionally, the side member may have a third edge or side that is substantially parallel to a fourth edge or side positioned opposite the third edge or side. In other embodiments where the side member has a frame-like shape, the side member has a cutout in its center with the same number of sides as the side member and each side of the cutout is substantially parallel to the corresponding perimeter edge or side of the side member.

It is a further aspect of embodiments of the present invention to provide a modular furniture and structure system that is easy to move. Thus, mobility can be imparted with ease by means of casters because the furniture and structures are relatively lightweight. Additionally, the system can be disassembled, or partially disassembled, and stacked flat for storage, moving, or shipping. The modular units can be readily dismantled, if desired, for shipment, storage, or redesigned assembly, and this is an added advantage that contributes to the practical benefits of embodiments of the invention.

Another aspect of embodiments of the present invention is to provide a modular furniture system for easy building and assembling by people of any age, including children. Thus, the system comprises means for easily and quickly building the modular units and fastening the modular units together.

Another aspect of embodiments of the present invention is to provide a modular furniture and structure system that is attractive in appearance. In some embodiments, the system is a neutral color and a natural luster that requires neither paint nor finish. In alternative embodiments, the system can be any color or have any finish desired by a purchaser, e.g., upholstery, metal, stained wood finish, paint, stone, etc. Further, the inner surfaces can have a different finish or be a different color than the outer surfaces. In one embodiment, at least one side member of the modular unit comprises at least one through hole (also called an "aperture" herein) extending from the outer surface to the inner surface. In some embodiments, the side member comprises at least one through hole for every outer surface perimeter edge. Thus, if the side member has four sides and four outer perimeter edges, then the side member has at least four through holes extending from the outer surface to the inner surface. In additional embodiments, the side member comprises at least two through holes for every outer perimeter edge. Thus, if the side member has four sides and four outer perimeter edges, then the side member has at least eight through holes extending from the outer surface to the inner surface. The through holes can be used to interconnect a finished surface, upholstered surface, cushion, wall surface, floor surface, table surface, counter top, writing surface, or other outer surface to the outer surface of the side member. For example, a screw can be positioned through the through hole and a nut, washer, and/or wing nut can be used to interconnect the finished surface, upholstered surface, cushion, wall surface, floor surface, table surface, counter top, writing surface, or other outer surface to the outer surface of the side member. Additionally, if two modular units are interconnected to one another and each modular unit has at least one through hole that aligns with at least one through hole of the other modular unit, then additional securing or interconnecting mechanisms can be used to interconnect the two modular units to one another, thus increasing the security and stability of the system. For example, a screw can be positioned through the two aligned through holes and secured using a nut, washer, and/or wing nut. This could be used when additional securing mechanisms are needed for structural reasons.

It is one aspect of various embodiments of the present invention to provide simple but sturdy articles of furniture composed of inexpensive components that are simple and inexpensive to manufacture.

Another aspect of embodiments of the present invention is to provide inexpensive furniture and structures. Accordingly, in one embodiment, the furniture and structures can be composed of modular units made of wood, which can be lacquered wood in some embodiments. However, great economies and increased efficiency are achievable by manufacturing the modular units of a pressed or molded composition, possibly tiny wood chips or the like embedded in tough plastic, which is stiff and rugged and well able to withstand rough usage over long periods of time. Alternate embodiments include modular units manufactured of metal, e.g., steel, aluminum, titanium, etc. Still other embodiments include modular units that are plastic, carbon fiber, ceramic, or composite materials such as medium density fiberboard (MDF). Thus, the modular units can be formed of any suitable lightweight, strong material.

One aspect of embodiments of the present invention is to provide a modular furniture system that can withstand spills, bumps, knocks, scratches, and other wear and tear over time.

It is another aspect of embodiments of the present invention to provide a modular furniture system that comprises modular units formed of side members interconnected to one another using connectors and the modular units are interconnected to one another using the same connectors. Thus, only one type of connector is needed to assemble the modular furniture system. In various embodiments of the present invention, the modular furniture system comprises connectors to interconnect one side member to another side member to form a modular unit. Thus, the connectors releasably lock or interconnect the side members together. In one embodiment, one connector is used to interconnect one side member to another side member. In another embodiment, two or more connectors are used to interconnect one side member to another side member. In one embodiment, the side members are interconnected to one another at approximately 90-degree angles. Thus, the plane of one side member forms approximately a 90-degree angle relative to the plane of the second side member.

In some embodiments of the present invention, the modular furniture system comprises connectors to interconnect one modular unit to another modular unit. Accordingly, the connectors releasably lock or interconnect the modular units together. In one embodiment, only the connectors interconnecting the side members to one another are the same connectors that interconnect the modular units to one another. In one embodiment, one connector is used to interconnect one modular unit to another modular unit. In another embodiment, two or more connectors are used to interconnect one modular unit to another modular unit.

Embodiments of the present invention use a system of grooves on the inner surfaces of the side members, where the grooves are suitable for engagement by connectors to interconnect the side members to one another and form the modular unit. The connectors frictionally engage the grooves to interconnect the side members to form a modular unit.

In various embodiments, the connectors are made of plastic, metal, wood, carbon fiber, or any other strong and resilient material that can bend or deform slightly to snappingly engage the side members. In one embodiment the connectors are plastic and are extrusion molded to reduce costs. In other embodiments, the connectors are plastic and are injection molded.

In some embodiments of the present invention, the modular units are interconnected to one another using connectors that frictionally engage an inner surface of a first side member of a first modular unit, a first cutout surface of the first side member of the first modular unit, an inner surface of a first side member of a second modular unit, and a first cutout surface of the first side member of the second modular unit. Thus, at least a portion of the outer surface of the first side member of the first modular unit is positioned in direct contact with and/or adjacent to and substantially parallel to at least a portion of the outer surface of the first side member of the second modular unit. Further, in some embodiments, the two or more side members of the first modular unit that are substantially perpendicular to the first side member of the first modular unit are positioned substantially parallel to the two or more side members of the second modular unit that are substantially perpendicular to the first side member of the second modular unit.

In one embodiment, a connector for interconnecting modular furniture is provided, the connector comprising: an upper surface with a rectangular shape top portion when viewed from a top plan view, the upper surface having an arcuate shape when viewed from a side elevation view; a substantially flat rear surface; a first leg extending from the upper surface and beyond the rear surface; a second leg extending from the upper surface and beyond the rear surface and positioned on an opposite end of the upper surface as the first leg; wherein the first leg has a first thickness proximate the rear surface and a second thickness proximate a distal end; wherein the second leg has a first thickness proximate the rear surface and a second thickness proximate a distal end; wherein the first and second legs are substantially straight proximate the rear surface then curve outward away from one another; and wherein the first and second legs are received by a grove in the modular furniture.

In one embodiment, a connector for interconnecting modular furniture is provided, the connector comprising: an upper surface with a rectangular shaped top portion when viewed from a top plan view; a first corner portion with a first wing extending outwardly therefrom, the first corner portion positioned on one end of the upper surface; a second corner portion with a second wing extending outwardly therefrom, the second corner portion positioned on an opposite end of the upper surface, wherein the upper surface has an arcuate shape between the first and second corner portions when viewed from a side elevation view; a substantially flat inner surface positioned opposite the upper surface; a first leg extending rearwardly from the first corner portion and extending beyond the inner surface; a second leg extending rearwardly from the second corner portion and extending beyond the inner surface; wherein the first leg is substantially parallel to the second leg; wherein the first leg has a first thickness proximate the inner surface and a second thickness proximate a distal end of the first leg; wherein the second leg has a first thickness proximate the inner surface and a second thickness proximate a distal end of the second leg; wherein the first and second legs are substantially straight proximate the inner surface then curve outward away from one another; and wherein the first leg is received by a first groove in the modular furniture and second leg is received by a second groove in the modular furniture.

In some embodiments the legs of the connector are positioned substantially perpendicular to the inner surface of the connector. The connector may have a bridge portion between the two legs. The legs may extend along all or a majority of the length of the corner portions such that the length of the corner portion is substantially the same as the length of the leg. The wings on the corners can provide additional strength and assist a user in pulling the connector out of the grooves of the modular furniture. When the connector is pushed into the groove, the legs can deflect inwardly and press against the outer surface of the groove to frictionally engage the groove.

In one embodiment, a modular furniture unit is provided comprising: a first side member comprising: an outer surface having a surface area and an outer perimeter edge; an inner surface substantially parallel to the outer surface and having a surface area and an inner surface perimeter edge, wherein the surface area of the inner surface is smaller than the surface area of the outer surface; four sides, wherein each side has a side surface and each side surface extends from the perimeter edge to the inner surface perimeter edge at an angle between approximately 30 degrees and 60 degrees relative to the outer surface; a cutout defined by a cutout edge substantially parallel to the perimeter edge; four cutout surfaces positioned proximate the cutout edge and positioned substantially perpendicular to the outer surface; and four grooves in the inner surface, wherein each groove is positioned proximate to a portion of the cutout edge and is substantially parallel to the portion of the cutout edge; a second side member comprising: an outer surface having a surface area and an outer perimeter edge; an inner surface substantially parallel to the outer surface and having a surface area and an inner surface perimeter edge, wherein the surface area of the inner surface is smaller than the surface area of the outer surface; four sides, wherein each side has a side surface and each side surface extends from the perimeter edge to the inner surface perimeter edge at an angle between approximately 30 degrees and 60 degrees relative to the outer surface; a cutout defined by a cutout edge substantially parallel to the perimeter edge; four cutout surfaces positioned proximate the cutout edge and positioned substantially perpendicular to the outer surface; and four grooves in the inner surface, wherein each groove is positioned proximate to a portion of the cutout edge and is substantially parallel to the portion of the cutout edge; and a plurality of connectors, wherein each connector in the plurality of connectors comprises a first leg, a second leg, and a bridge portion positioned between the first leg and the second leg; wherein a first leg of a first connector in the plurality of connectors is positioned in a first groove of the four grooves of the first side member and a second leg of the first connector is positioned in a first groove of the four grooves of the second side member such that the first side member is interconnected to the second side member; and wherein a first side surface of a first side in the four sides of the first side member is positioned adjacent to a first side surface of a first side in the four sides of the second side member. In a further embodiment, the modular furniture further comprises a third side member comprising: an outer surface having a surface area and an outer perimeter edge; an inner surface substantially parallel to the outer surface and having a surface area and an inner surface perimeter edge, wherein the surface area of the inner surface is smaller than the surface area of the outer surface; four sides, wherein each side has a side surface and each side surface extends from the perimeter edge to the inner surface perimeter edge at an angle between approximately 30 degrees and 60 degrees relative to the outer surface; a cutout defined by a cutout edge substantially parallel to the perimeter edge; four cutout surfaces positioned proximate the cutout edge and positioned substantially perpendicular to the outer surface; and four grooves in the inner surface, wherein each groove is positioned proximate to a portion of the cutout edge and is substantially parallel to the portion of the cutout edge. In some embodiments, a first leg of a second connector in the plurality of connectors is positioned in a second groove of the four grooves of the second side member and a second leg of the second connector is positioned in a first groove of the four grooves of the third side member such that the second side member is interconnected to the third side member, and wherein a second side surface of a second side in the four sides of the second side member is positioned adjacent to a first side surface of a first side in the four sides of the third side member. In additional embodiments, the modular furniture system further comprises a fourth side member comprising: an outer surface having a surface area and an outer perimeter edge; an inner surface substantially parallel to the outer surface and having a surface area and an inner surface perimeter edge, wherein the surface area of the inner surface is smaller than the surface area of the outer surface; four sides, wherein each side has a side surface and each side surface extends from the perimeter edge to the inner surface perimeter edge at an angle between approximately 30 degrees and 60 degrees relative to the outer surface; a cutout defined by a cutout edge substantially parallel to the perimeter edge; four cutout surfaces positioned proximate the cutout edge and positioned substantially perpendicular to the outer surface; and four grooves in the inner surface, wherein each groove is positioned proximate to a portion of the cutout edge and is substantially parallel to the portion of the cutout edge. In various embodiments, a first leg of a third connector in the plurality of connectors is positioned in a second groove of the four grooves of the third side member and a second leg of the third connector is positioned in a first groove of the four grooves of the fourth side member such that the third side member is interconnected to the fourth side member, and wherein a second side surface of a second side in the four sides of the third side member is positioned adjacent to a first side surface of a first side in the four sides of the fourth side member. In a further embodiment, a first leg of a fourth connector in the plurality of connectors is positioned in a second groove of the four grooves of the fourth side member and a second leg of the third connector is positioned in a second groove of the four grooves of the first side member such that the fourth side member is interconnected to the first side member, and wherein a second side surface of a second side in the four sides of the fourth side member is positioned adjacent to a second side surface of a second side in the four sides of the first side member.

In one embodiment, a modular furniture system is provided. The modular furniture system comprises: a plurality of modular units, where each modular unit in the plurality of modular units comprises: a first side member including an outer surface having a surface area, an inner surface substantially parallel to the outer surface and having a surface area and an inner surface perimeter edge, a cutout, a perimeter edge, a cutout edge substantially parallel to the perimeter edge, four sides, four cutout surfaces, and four grooves in the inner surface, where each groove is positioned proximate to a portion of the perimeter edge and is substantially parallel to the portion of the perimeter edge, where each side has a side surface and each side surface extends from the perimeter edge to the inner surface perimeter edge at an angle between approximately 30 degrees and 60 degrees relative to the outer surface such that the surface area of the inner surface is smaller than the surface area of the outer surface; a second side member including an outer surface having a surface area, an inner surface substantially parallel to the outer surface and having a surface area and an inner surface perimeter edge, a cutout, a perimeter edge, a cutout edge substantially parallel to the perimeter edge, four sides, four cutout surfaces, and four grooves in the inner surface, where each groove is positioned proximate to a portion of the perimeter edge and is substantially parallel to the portion of the perimeter edge, where each side has a side surface and each side surface extends from the perimeter edge to the inner surface perimeter edge at an angle between approximately 30 degrees and 60 degrees relative to the outer surface such that the surface area of the inner surface is smaller than the surface area of the outer surface; and a first plurality of connectors, where each connector in the first plurality of connectors comprises a first leg, a second leg, and a bridge portion positioned between the first leg and the second leg; where a first leg of a first connector in the first plurality of connectors is positioned in a first groove of the four grooves of the first side member and a second leg of the first connector is positioned in a first groove of the four grooves of the second side member such that the first side member is interconnected to the second side member; where a first side surface of a first side in the four sides of the first side member is proximate to the first groove of the first side member, a first side surface of a first side in the four sides of the second side member is proximate to the first groove of the second side member, and the first side surface of the first side member is positioned adjacent to the first side surface of the second side member; and a second plurality of connectors, where each connector in the second plurality of connectors interconnects one modular unit to another modular unit in the plurality of modular units.

In an additional embodiment, the modular furniture system further comprises a top surface, where the top surface is positioned adjacent to at least one outer surface of one modular unit. In one embodiment, each modular unit in the plurality of modular units further comprises a third side member including an outer surface having a surface area, an inner surface substantially parallel to the outer surface and having a surface area and an inner surface perimeter edge, a cutout, a perimeter edge, a cutout edge substantially parallel to the perimeter edge, four sides, four cutout surfaces, and four grooves in the inner surface, where each groove is positioned proximate to a portion of the perimeter edge and is substantially parallel to the portion of the perimeter edge, where each side has a side surface and each side surface extends from the perimeter edge to the inner surface perimeter edge at an angle between approximately 30 degrees and 60 degrees relative to the outer surface such that the surface area of the inner surface is smaller than the surface area of the outer surface. In a further embodiment, a first leg of a second connector in the first plurality of connectors is positioned in a second groove of the four grooves of the second side member and a second leg of the second connector is positioned in a first groove of the four grooves of the third side member such that the second side member is interconnected to the third side member, and where a second side surface of a second side in the four sides of the second side member is proximate to the second groove of the second side member, a first side surface of a first side in the four sides of the third side member is proximate to the first groove of the third side member, and the second side surface of the second side member is positioned adjacent to the first side surface of the third side member. In some embodiments, each modular unit in the plurality of modular units further comprises a fourth side member including an outer surface having a surface area, an inner surface substantially parallel to the outer surface and having a surface area and an inner surface perimeter edge, a cutout, a perimeter edge, a cutout edge substantially parallel to the perimeter edge, four sides, four cutout surfaces, and four grooves in the inner surface, where each groove is positioned proximate to a portion of the perimeter edge and is substantially parallel to the portion of the perimeter edge, where each side has a side surface and each side surface extends from the perimeter edge to the inner surface perimeter edge at an angle between approximately 30 degrees and 60 degrees relative to the outer surface such that the surface area of the inner surface is smaller than the surface area of the outer surface. Further, a first leg of a third connector in the first plurality of connectors is positioned in a second groove of the four grooves of the third side member and a second leg of the third connector is positioned in a first groove of the four grooves of the fourth side member such that the third side member is interconnected to the fourth side member, and where a second side surface of a second side in the four sides of the third side member is proximate to the second groove of the third side member, a first side surface of a first side in the four sides of the fourth side member is proximate to the first groove of the fourth side member, and the second side surface of the third side member is positioned adjacent to the first side surface of the fourth side member. Additionally, a first leg of a fourth connector in the first plurality of connectors is positioned in a second groove of the four grooves of the fourth side member and a second leg of the third connector is positioned in a second groove of the four grooves of the first side member such that the fourth side member is interconnected to the first side member, and where a second side surface of a second side in the four sides of the fourth side member is proximate to the second groove of the fourth side member, a second side surface of a second side in the four sides of the first side member is proximate to the second groove of the first side member, and the second side surface of the fourth side member is positioned adjacent to the second side surface of the first side member.

Various methods of forming or arranging a modular furniture system are provided. In one embodiment, a method of arranging a modular furniture system is provided comprising the steps of: providing a plurality of modular units, where each modular unit in the plurality of modular units comprises: a plurality of side members, where each side member comprises an outer surface having a surface area, an inner surface substantially parallel to the outer surface and having a surface area and an inner surface perimeter edge, a cutout, a perimeter edge, a cutout edge substantially parallel to the perimeter edge, four sides, four cutout surfaces, and four grooves in the inner surface, where each groove is positioned proximate to a portion of the perimeter edge and is substantially parallel to the portion of the perimeter edge, where each side has a side surface and each side surface extends from the perimeter edge to the inner surface perimeter edge at an angle between approximately 30 degrees and 60 degrees relative to the outer surface such that the surface area of the inner surface is smaller than the surface area of the outer surface; and a plurality of connectors, where each connector in the plurality of connectors comprises a first leg, a second leg, and a bridge portion positioned between the first leg and the second leg; arranging a first modular unit in the plurality of modular units; arranging a second modular unit in the plurality of modular units; and interconnecting the first modular unit to the second modular unit, where the interconnecting comprises: positioning an outer surface of a first side member in the plurality of side members of the first modular unit adjacent to an outer surface of a first side member in the plurality of side members of the second modular unit; and frictionally engaging a fifth connector in the plurality of connectors to the first side member of the first modular unit and the first side member of the second modular unit such that a flat surface of a bridge portion of the fifth connector is positioned adjacent to a first cutout surface of the first side member of the first modular unit and a first cut out surface of the first side member of the second modular unit, and where an inner surface of a first leg of the fifth connector is positioned adjacent to an inner surface of the first side member of the first modular unit and an inner surface of a second leg of the fifth connector is positioned adjacent to an inner surface of the first side member of the second modular unit.

In a further embodiment, the step of assembling the first modular unit comprises: positioning a first side surface of a first side member in the plurality of side members adjacent to a first side surface of a second side member in the plurality of side members such that the inner surface of the first side member and an inner surface of the second side member are positioned toward a center of the first modular unit; inserting a first leg of a first connector in the plurality of connectors into a first groove of the four grooves of the first side member; inserting a second leg of the first connector into a first groove of the four grooves of the second side member such that the first side member is interconnected to the second side member; positioning a second side surface of the second side member adjacent to a first side surface of a third side member in the plurality of side members such that the inner surface of the second side member and an inner surface of the third side member are positioned toward the center of the first modular unit; inserting a first leg of a second connector in the plurality of connectors into a second groove of the four grooves of the second side member; inserting a second leg of the second connector into a first groove of the four grooves of the third side member such that the second side member is interconnected to the third side member; positioning a second side surface of the third side member adjacent to a first side surface of a fourth side member in the plurality of side members such that the inner surface of the third side member and an inner surface of the fourth side member are positioned toward the center of the first modular unit; inserting a first leg of a third connector in the plurality of connectors into a second groove of the four grooves of the third side member; inserting a second leg of the third connector into a first groove of the four grooves of the fourth side member such that the third side member is interconnected to the fourth side member; positioning a second side surface of the fourth side member adjacent to a second side surface of the first side member such that the inner surface of the fourth side member and the inner surface of the first side member are positioned toward the center of the first modular unit; inserting a first leg of a fourth connector in the plurality of connectors into a second groove of the four grooves of the fourth side member; and inserting a second leg of the fourth connector into a second groove of the four grooves of the first side member such that the fourth side member is interconnected to the first side member.

For purposes of further disclosure, the following references generally relate to modular furniture systems assembled from a plurality of components are hereby incorporated by reference in their entireties:

U.S. Pat. No. 3,836,217 issued to Shiina discloses projections at the edges of the panels and requires an edge engagement member that slides over the edges to hold panels together;

U.S. Pat. No. 5,588,726 issued to Lee discloses the use of mortise and tenon edges, but a channel is required in the wall member for a connector that includes the tenons;

U.S. Pat. No. 3,885,845 issued to Krieks discloses a mortise and tenon arrangement, but longitudinal pins are required to hold the panels in place; U.S. Pat. No. 3,583,780 issued to Berkowitz discloses panels that require pins to affix the panels together;

German Patent No. DE 19949849 issued to Nichtnennung discloses panels that have tongues and grooves, but relies on pins to hold the panels together;

European Patent No. EP 1022968 issued to Huyghe discloses panels that require grooved interconnecting elements that engage with panel edges in order to create the required structure; and PCT Patent Publication No. WO 1987/000406 issued to Garcia discloses a number of panels that include tongues and grooves, but the upper and lower panels are of a different construction from the side panels and are required to connect the side panels together.

The phrases "at least one", "one or more", and "and/or", as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

Unless otherwise indicated, all numbers expressing quantities, dimensions, conditions, and so forth used in the specification and claims are to be understood as being modified in all instances by the term "about".

The term "a" or "an" entity, as used herein, refers to one or more of that entity. As such, the terms "a" (or "an"), "one or more," and "at least one" can be used interchangeably herein.

The use of "including," "comprising," or "having" and variations thereof herein is meant to encompass the items listed thereafter and equivalents thereof as well as additional items. Accordingly, the terms "including," "comprising," and "having" and variations thereof can be used interchangeably herein.

It shall be understood that the term "means" as used herein shall be given its broadest possible interpretation in accordance with 35 U.S.C. Section 112(f). Accordingly, a claim incorporating the term "means" shall cover all structures, materials, or acts set forth herein, and all of the equivalents thereof. Further, the structures, materials, or acts and the equivalents thereof shall include all those described in the summary of the invention, brief description of the drawings, detailed description, abstract, and claims themselves.

These and other advantages will be apparent from the disclosure of the invention(s) contained herein. The above-described embodiments, objectives, and configurations are neither complete nor exhaustive. The Summary of the Invention is neither intended nor should it be construed as being representative of the full extent and scope of the present invention. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description and no limitation as to the scope of the present invention is intended by either the inclusion or non-inclusion of elements, components, etc. in this Summary of the Invention. Additional aspects of the present invention will become more readily apparent from the Detailed Description, particularly when taken together with the drawings.

BRIEF DESCRIPTION OF THE DRAWINGS

Those of skill in the art will recognize that the following description is merely illustrative of the principles of the invention, which may be applied in various ways to provide many different alternative embodiments. This description is made for illustrating the general principles of the teachings of this invention and is not meant to limit the inventive concepts disclosed herein.

The accompanying drawings, which are incorporated in and constitute a part of the specification, illustrate embodiments of the invention and together with the general description of the invention given above and the detailed description of the drawings given below, serve to explain the principles of the invention.

FIGS. 6A-E are various views of one embodiment of a side member;

Figure 1:
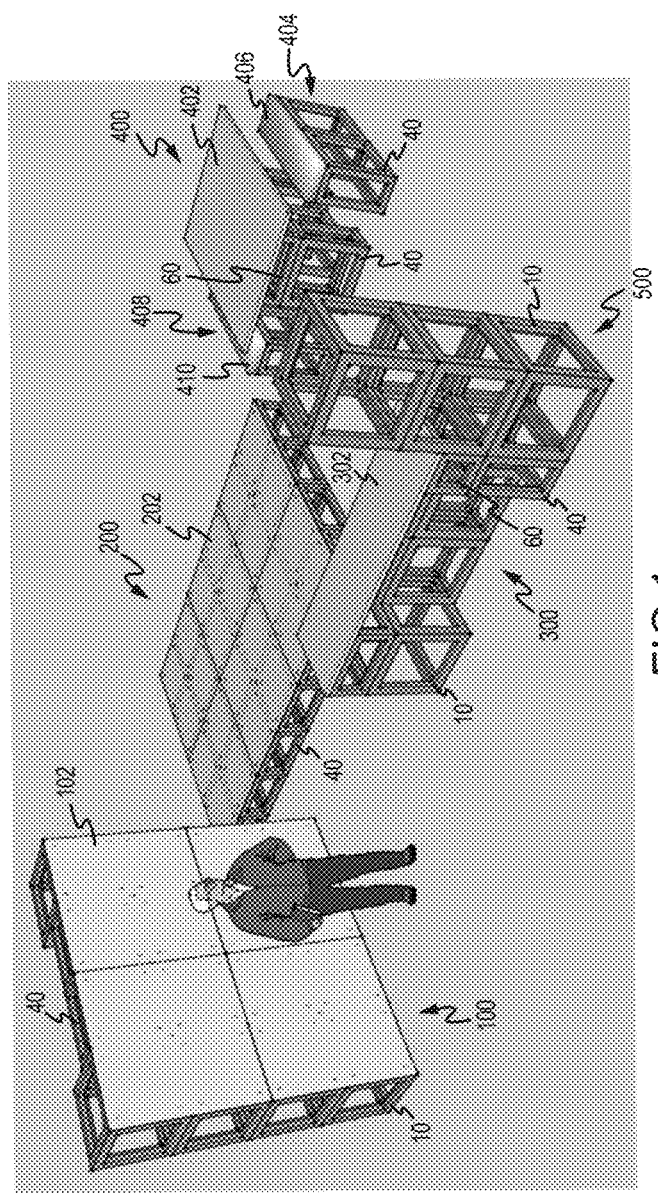
FIG. 1 shows various embodiments of modular furniture systems.

To assist in the understanding of the embodiments of the present invention the following list of components and associated numbering found in the drawings is provided herein:

Component No. Component Name
10 Full Cube
12 First Side Member (of Full Cube)
14 Second Side Member (of Full Cube)
16 Third Side Member (of Full Cube)
18 Sixth Side Member (of Full Cube)
20 Fourth Side Member (of Full Cube)
22 Fifth Side Member (of Full Cube)
24 Groove
26 Aperture
28 Cutout
29 Side Surface (of Connector)
30 Connector
31 Flat Inner Surface (of Connector)
32 First Leg (of Connector)
33 Outer Surface (of Connector)
34 Second Leg (of Connector)
35 Inner Surface of Leg (of Connector)
36 Distal End of Leg (of Connector)
37 Outer Surface of Leg (of Connector)
38 Bridge Portion (of Connector)
39 Corner with Wing (of Connector)
40 Half Cube
42 First Rectangular Side Member
44 Second Rectangular Side Member
46 First Large Square Side Member
48 Third Rectangular Side Member
50 Fourth Rectangular Side Member
52 Second Large Square Side Member
60 Quarter Cube
62 First Small Square Side Member
64 First Rectangular Side Member
66 Second Rectangular Side Member
68 Third Rectangular Side Member
70 Fourth Rectangular Side Member
72 Second Small Square Side Member 80 Eighth Cube
82 First Small Square Side Member
84 Second Small Square Side Member
86 Third Small Square Side Member
88 Fourth Small Square Side Member
90 Fifth Small Square Side Member
92 Sixth Small Square Side Member
100 Wall System
102 Wall Surface
200 Floor System
202 Floor Surface
300 Desk or Table System
302 Desk Surface
390 Wing of Corner of Connector
400 Table System
402 Table Top or Table Surface
404 Seating System
406 Seat Surface
408 Seating System
410 Seat Surface
500 Shelving or Cabinet System
600 Side Member or Small Square Side Member
602 Outer Surface
604 Side Surface
604A First Side Surface
604B Second Side Surface
604C Third Side Surface
604D Fourth Side Surface
606 Cutout Surface
606A First Cutout Surface
606B Second Cutout Surface
608 Inner Surface
610 Outer Perimeter
610A First Outer Perimeter Edge
610B Second Outer Perimeter Edge
610C Third Outer Perimeter Edge
610D Fourth Outer Perimeter Edge
611 Inner Surface Perimeter
611A First Inner Surface Perimeter Edge
611B Second Inner Surface Perimeter Edge
611C Third Inner Surface Perimeter Edge
611D Fourth Inner Surface Perimeter Edge
612 Inner Perimeter or Cutout Edge
700 System of Modular Units
702 First Modular Unit
702A First Side Member of First Modular Unit
702B Second Side Member of First Modular Unit
702C Third Side Member of First Modular Unit
704 Second Modular Unit
704A First Side Member of Second Modular Unit
704B Second Side Member of Second Modular Unit
704C Third Side Member of Second Modular Unit
A1 Side Surface Angle
A2 Groove Angle
L1 Length of the Small Square Side Member
L2 Length of the Groove from the Inner Surface Edge
L3 Length of the Groove
L4 Length between Inner Surfaces of Legs of Connector
L5 Length of Rectangular Side Member
L6 Length of Cutout of Rectangular Side Member
W1 Width of the Side Member
W2 Width of the Groove
W3 Width of Distal End of Leg of Connector
W4 Width of Middle Portion of Leg of Connector
W5 Width of Proximal End of Leg of Connector
W6 Width of Frame-Like Portion
W7 Width of Inner Surface
H1 Height of the Small Square Side Member
H2 Height of Connector
H3 Height of Leg of Connector
H4 Height of Rectangular Side Member It should be understood that the drawings are not necessarily to scale, and various dimensions may be altered. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. Additionally, aspects and features of one embodiment described herein or shown in the drawings can be used or combined with other aspects and features of other embodiments. Thus, the embodiments can be combined or modified with features of other embodiments.

FIG. 1 shows various embodiments of modular furniture systems. For example, a wall system 100 is shown comprising a wall surface 102 (also called a "top surface") and a plurality of modular units, which can include any number of full cubes 10, half cubes 40, and other sized cubes depending on the desired wall size and performance requirements. The modular units 10, 40 may cover the entire back of the wall surface 102 or the modular units 10, 40 may form a frame-like shape and be positioned on the perimeter of the wall surface 102 or the modular units 10, 40 may form an "X" or a "T" shape in the middle of the back of the wall surface 102. The wall surface 102 may also be a finished surface that can be smooth for writing (e.g., a white board or chalk board); a fabric material onto which items can be hung or into which items can be mounted; cushion or cork material into which tacks, nails, pins, etc. can be pushed to hang posters, papers, pictures, banners, tablets, whiteboards, etc.; a noise dampening material to dampen noises often associated with large rooms, conference rooms, or lecture halls; a magnetic material for securing magnetic items and magnets; or any other wall surface or material. The wall surface 102 me be one piece secured to multiple modular units 10, 40 or may be multiple pieces where each piece is secured to one or more modular units 10, 40. The wall surface 102 will likely be positioned at about a 90-degree angle relative to the floor, although the wall surface 102 could be angled slightly such that it is at an angle between about 80 degrees and 100 degrees relative to the floor. A portable, mobile wall system 100 can be used in rooms that need to be divided or separated into two or more smaller areas, in showrooms to demonstrate products, in conferences or expos where multiple companies or products are on display, in classrooms where whiteboards or chalkboards are needed, in bedrooms to separate areas of the bedroom, in studio apartments to separate the bed from the kitchen, in offices to create separate work, common, and/or conference spaces, and in any other situation where a temporary wall or vertical surface is desired. Alternatively, the wall system 100 may be interconnected or secured to a permanent wall (meaning a non-mobile wall) or permanent floor (meaning a non-mobile floor) or other furniture for stability and/or security. The wall surface 102 can be sized to fit the modular units positioned below the wall surface 102 or the wall surface 102 can extend outward past the modular units.

A floor system 200 is shown comprising a plurality of modular units, which in this embodiment are half cubes 40, and a floor surface 202 (also called a "top surface"). Other sized modular units can be used in other embodiments, for example, full cubes 10, quarter cubes 60, eighth cubes 80, etc. Further, any number of modular units can be used depending on the desired size of the floor surface 202. Additionally, any type of floor surface 202 can be used, for example, hardwood, tile, engineered hardwood, laminate, carpet, metal, hard plastic, acrylic, glass, composite material, etc. Cushions or other padding can be positioned between the modular units 40 and floor surface 202 to provide a softer surface. A raised floor system 200 can be used for server rooms where large quantities of wires need to be ran under the servers and where a cooling system needs to be provided at least partially under the servers. A raised floor system 200 can also be used for demonstrations or expos where a raised surface is desired. Additionally, a temporary raised floor system 200 may be desired for use at a party or wedding as a dance floor. A temporary raised floor system 200 can be used for outdoor parties or gatherings where a clean surface is desired as ground cover. Alternatively, the floor system 200 may be interconnected or secured to a permanent wall (meaning a non-mobile wall) or permanent floor (meaning a non-mobile floor) for stability and/or security. The floor surface 202 can be sized to fit the modular units positioned below the floor surface 202 or the floor surface 202 can extend outward past the modular units.

A desk or table system 300 is also shown in FIG. 1. The desk or table system 300 comprises a desk surface 302 (also called a "top surface") and a plurality of modular units, which can be any size and include full cubes 10, half cubes 40, and quarter cubes 60 in the embodiment shown. Any number of modular units and any size of modular units can be used depending on the desired size and height of the desk surface 302. The system 300 could also be used as cabinets, such as kitchen cabinets with kitchen countertops or garage cabinets with a tool or work bench as the top surface 302. Drawers and cabinets can be added to modular units of the desk system 300. Additionally, any top surface 302 can be used for the top of the desk, table, or counter. For example, the top surface 302 may be wood, metal, glass, stone, quartz, concrete, plastic, laminate, a composite material, or any other known desk, table, or counter surface. Alternatively, the desk or table system 300 may be interconnected or secured to a permanent wall (meaning a non-mobile wall) or permanent floor (meaning a non-mobile floor) for stability and/or security. The top surface 302 can be sized to fit the modular units positioned below the top surface 302 or the top surface 302 can extend outward past the modular units.

The modular units can also be used to create a shelving or cabinet system 500. In the embodiment shown, the modular units are all full cubes 10. However, other cube sizes can be used or a mix of different cube sizes can be used. Shelves, drawers, or doors (e.g., cabinet doors) could be added to the shelving or cabinet system 500 to create a system with any combination of shelves, drawers, and cabinets. For example, this system 500 could be used to create a filing cabinet or a shelving unit. The shelving or cabinet system 500 may also be interconnected to the desk or table system 300 (as shown), the floor system 200, the wall system 100, or a table system 400. Alternatively, the shelving or cabinet system 500 may be interconnected or secured to a permanent wall (meaning a non-mobile wall) or permanent floor (meaning a non-mobile floor) for stability and/or security.

A table system 400 and a seating system 404 are also shown in FIG. 1. The table system 400 comprises a table top or table surface 402 and modular units, which may include eighth cubes 80, quarter cubes 60, half cubes 40, and/or full cubes 10. The table top or table surface 402 can be any material used as table tops, e.g., wood, metal, plastic, composite material, laminate, stone, quartz, concrete, tile, ceramic, acrylic, glass, etc. The table top 402 can be sized to fit the modular units positioned below the table top 402 or the table top 402 can extend outward past the modular units, as shown in FIG. 1. One or more seating systems 404, 408 can be used with the table system 400, desk system 300, floor system 202, or on its own. Each seating system 404, 408 comprises a seat surface 406, 410 (which may be a cushion surface, upholstered surface, or other seat surface) and modular units, which are half cubes 40 in the embodiment shown. Other cube sizes can be used in other embodiments. Any known seat surface 406, 410 could be used in various embodiments, for example, leather, wood, plastic, metal, stone, etc. A cushion or foam may be positioned between the modular units and the seat surface 406, 410 to provide additional padding or support for comfort. Further, the seat 404, 408 could include a seat back made of a common seat back material or made of modular units with seat back surfaces. Alternatively, the table system 400 and/or seating system 404, 408 may be interconnected or secured to a permanent wall (meaning a non-mobile wall) or permanent floor (meaning a non-mobile floor) for stability and/or security.

For all of the systems 100, 200, 300, 400, 500 shown in FIG. 1, any different number of modular units can be used, different modular unit sizes and shapes can be used, different materials can be used, and different top surfaces or upper surfaces can be used.

In other embodiments, the modular furniture system can be used to create couches, sofas, chairs, lounge chairs, chaise lounges, bureaus, dressers, children's furniture, beds, bunk beds, shelving units, garage storage, cabinets, work benches, tool cabinets, shop benches, mechanic bins, kitchen cabinets, stage platforms, cabling floors, wall partitions, sign fronts, storage closets, file cabinets, lockers, desks, tables, chairs, benches, counter tops, end tables, ottomans, television stands, storage trunks, refrigerators, kegorators, wine storage, wine chillers, book shelves, closets, dog houses, dog beds, and more. Additionally, wheels can be added to the systems to make the systems even more mobile and moveable.

Figure 2:
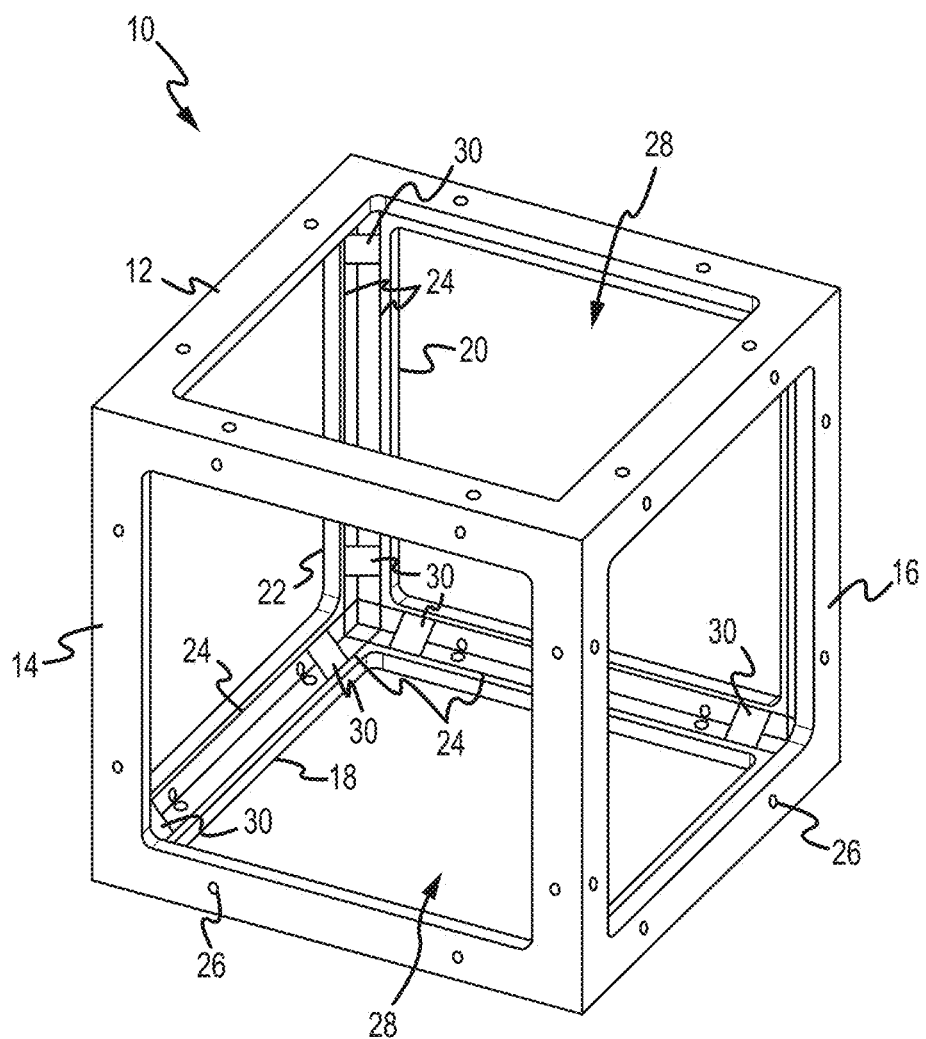
FIG. 2 depicts one embodiment of a modular unit or cube.

FIG. 2 shows one embodiment of a modular unit, which is a full cube 10. The embodiment shown comprises six side members 12, 14, 16, 18, 20, 22, all of which are the same size and are the large square shape (also called "large square side members"). Additionally, each side member 12, 14, 16, 18, 20, 22 has a frame-like shape with a cutout 28 in the center of the side member 12, 14, 16, 18, 20, 22. The cutout 28 has rounded corners for ease of manufacturing and aesthetic purposes. The side members 12, 14, 16, 18, 20, 22 are assembled such that their outer surfaces are positioned on the outside of the modular unit 10 and the side members' inner surfaces are positioned on the inside of the modular unit 10. The inner surfaces of the side members 12, 14, 16, 18, 20, 22 include grooves 24 to receive the connectors 30. One or more connectors 30 are positioned in each corner joint formed by the intersection of two side members 12, 14, 16, 18, 20, 22. Specifically, a portion of each connector 30 is positioned in one groove 24 of one side member 12, 14, 16, 18, 20, 22 and another portion of the connector 30 is positioned in one groove 24 of a different side member 12, 14, 16, 18, 20, 22. Thus, the first side member 12 (also called the "top member") is interconnected on one side to the second side member 14, interconnected on another side to the third side member 16, interconnected on another side to the fourth side member 20, and interconnected on its last side to the fifth side member 22 via a plurality of connectors 30. A sixth side member 18 (also called the "bottom member") is positioned substantially parallel to and opposite the first side member 12. The sixth side member 18 is interconnected on one side to the second side member 14, interconnected on another side to the third side member 16, interconnected on another side to the fourth side member 20, and interconnected on its last side to the fifth side member 22. The second side member 14 is interconnected on one side to the third side member 16 and interconnected on its opposite side to the fifth side member 22. The third side member 16 is also interconnected on one side to the fourth side member 20. The fourth side member 20 is interconnected on one side to the fifth side member 22. Each side member 12, 14, 16, 18, 20, 22 includes a plurality of apertures 26 for mounting items (such as floor surfaces, table surfaces, desk surfaces, pictures, wall surfaces, curtains, decorations, etc.) to the outer surfaces of the side members and modular unit 10. In one embodiment, the apertures 26 (also called "through holes" herein) have a diameter between about 5.0 mm and about 20.0 mm. In a preferred embodiment, the apertures 26 have a diameter of about 12.70 mm. The apertures 26 may be threaded to receive threaded screws.

Figure 5:
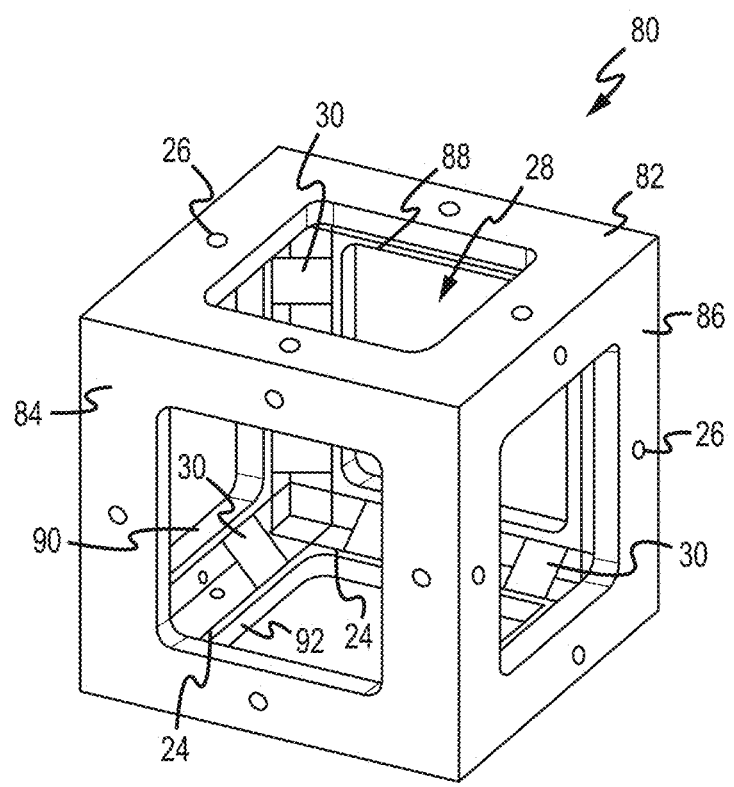
FIG. 5 depicts one embodiment of a modular unit or eighth cube.
Figure 6A:
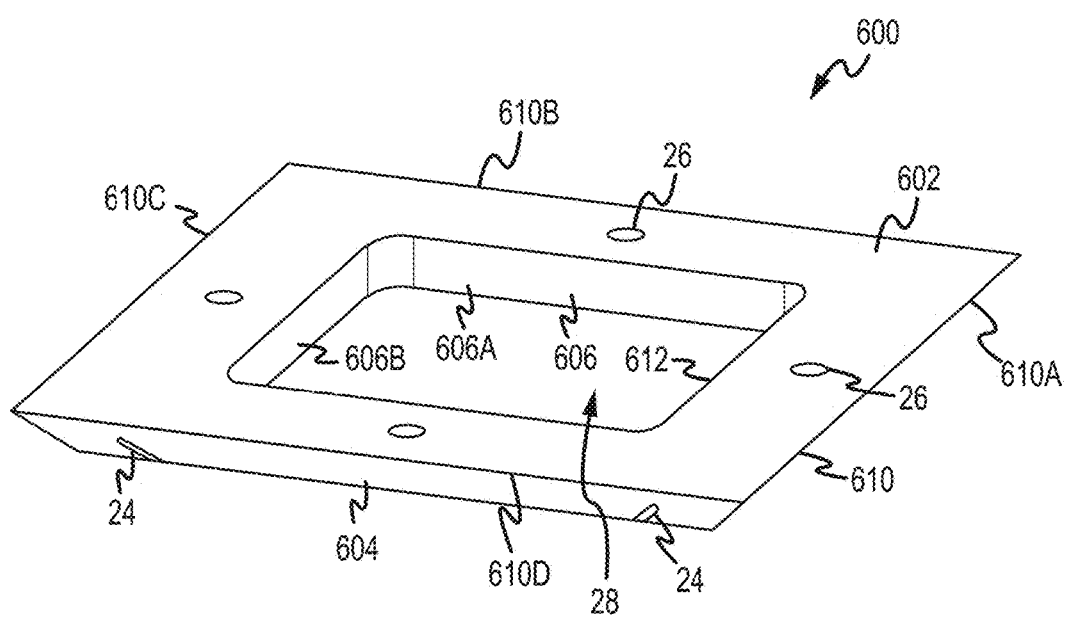

In various embodiments, the apertures 26 are positioned a distance from the corner of the side member 12, 14, 16, 18, 20, 22 (i.e., a distance along the frame portion) equal to half of the length of the small square side member (82, 84, 86, 88, 90, 92 of FIG. 5; 600 of FIGS. 6A-C). Thus, a tablet or panel system can be used with the modular units 10, 40, 60, 80 and placed on top of the outer surfaces of side members such that the panels or tablets will align no matter what size cubes 10, 40, 60, 80 are used. Further, four panels or tablets would be needed to cover the large square side member 12, 14, 16, 18, 20, 22, two panels or tablets would be needed to cover a rectangular side member (42, 44, 48, 50 of FIG. 3A), and one panel or tablet would be needed to cover the small square side member (600 in FIGS. 6A-C). Additionally, panels/tablets the size of the large square side member 12, 14, 16, 18, 20, 22 or the size of the rectangular side member (42, 44, 48, 50 of FIG. 3A) can be used. The tablet or panel system may be screwed or otherwise secured directly onto the side members or the tablets/panels may interconnect to brackets that are directly interconnected to the side members.

Figure 3A:
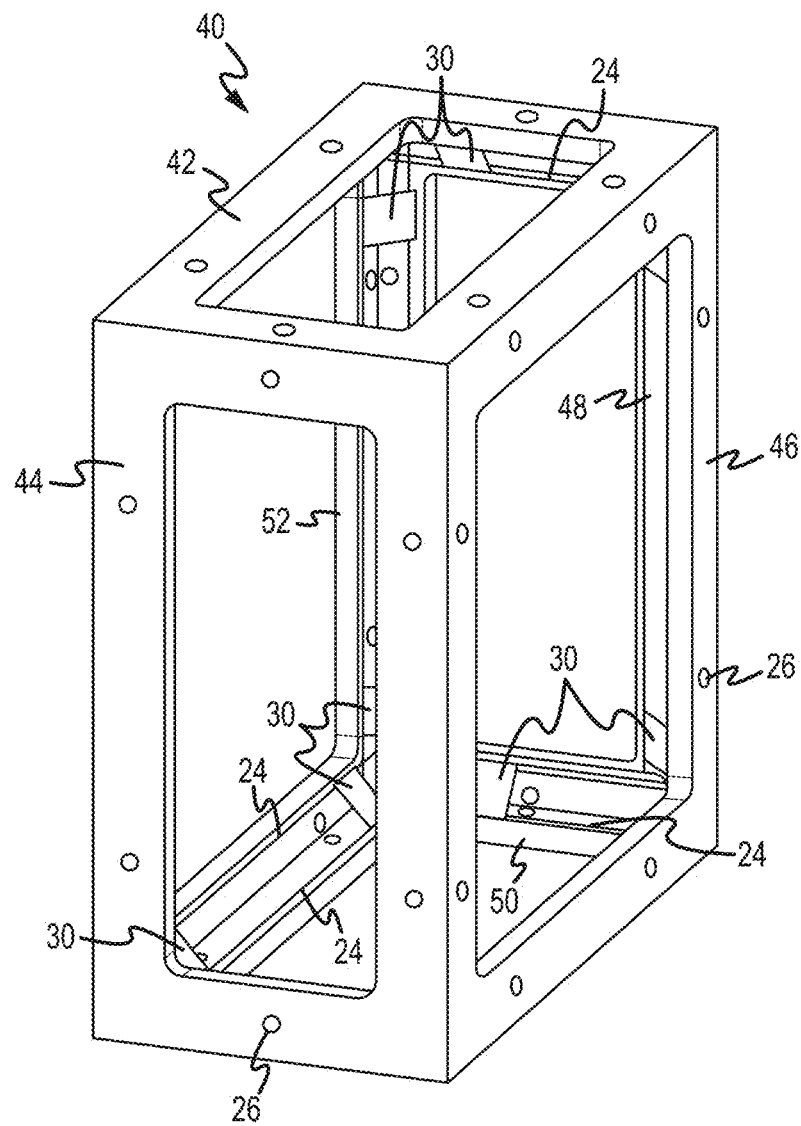
FIG. 3A is a front perspective view of one embodiment of a modular unit or half cube.

FIG. 3A is a front perspective view of a modular unit or half cube 40. The half cube 40 includes six side members, which typically include two large square side members 46, 52 and four rectangular side members 42, 44, 48, 50, where the long side of the rectangular side member 42, 44, 48, 50 is the same length as the sides of the large square side member 46, 52 and where the short side of the rectangular side member 42, 44, 48, 50 is half the length of the long side. Additionally, each side member 42, 44, 46, 48, 50, 52 has a frame-like shape with a cutout in the center of the side member 42, 44, 46, 48, 50, 52. The side members 42, 44, 46, 48, 50, 52 are assembled such that their outer surfaces are positioned on the outside of the modular unit 40 and the side members' inner surfaces are positioned on the inside of the modular unit 40. The inner surfaces of the side members 42, 44, 46, 48, 50, 52 include grooves 24 to receive the connectors 30. One or more connectors 30 are positioned in each corner joint formed by the intersection of two side members 42, 44, 46, 48, 50, 52. Specifically, a portion of each connector 30 is positioned in one groove 24 of one side member 42, 44, 46, 48, 50, 52 and another portion of the connector 30 is positioned in one groove 24 of a different side member 42, 44, 46, 48, 50, 52. In the embodiment shown, only one connector 30 is used in a side joint of the shorter length and two connectors 30 are used in a side joint of the longer length. In other embodiments, more or fewer connectors 30 may be used in each side joint. Thus, the first rectangular side member 42 (also called the "top member") is interconnected on one long side to the first large square side member 46, interconnected on the other long side to the second large square side member 52, interconnected on one short side to the second rectangular side member 44, and interconnected on the other short side to the third rectangular side member 48. A fourth rectangular side member 50 (also called the "bottom member") is positioned substantially parallel to and opposite the first rectangular side member 42. The fourth rectangular side member 50 is interconnected on one long side to the first large square side member 46, interconnected on the other long side to the second large square side member 52, interconnected on one short side to the second rectangular side member 44, and interconnected on the other short side to the third rectangular side member 48. The second rectangular side member 44 is interconnected on one long side to the first large square side member 46 and interconnected on its opposite long side to the second large square side member 52. The third rectangular side member 48 is also interconnected on one long side to the first large square side member 46 and interconnected on its opposite long side to the second large square side member 52. Each side member 42, 44, 46, 48, 50, 52 includes a plurality of apertures 26 for mounting items (such as floor surfaces, table surfaces, desk surfaces, pictures, wall surfaces, curtains, decorations, etc.) to the outer surface. Typically, a long side of a side member 42, 44, 46, 48, 50, 52 includes two apertures 26 and a short side of a side member 42, 44, 48, 50 includes one aperture 26. However, in alternative embodiments, the side members 42, 44, 46, 48, 50, 52 can have any number of apertures 26. In one embodiment, the apertures 26 (also called "through holes" herein) have a diameter between about 5.0 mm and about 20.0 mm. In a preferred embodiment, the apertures 26 have a diameter of about 12.70 mm. The apertures 26 may be threaded to receive threaded screws.

Figure 3C:
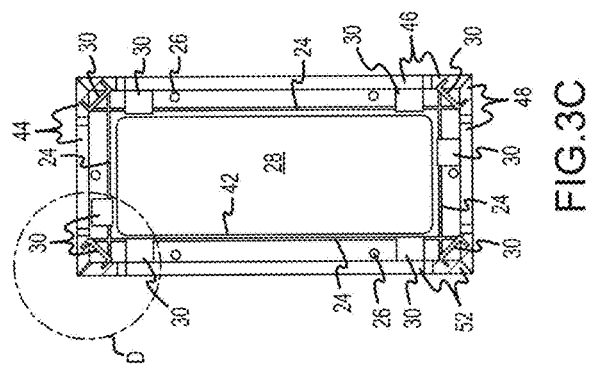
FIG. 3C is a sectional view of the modular unit of FIG. 3B taken along cut C-C.
Figure 3D:
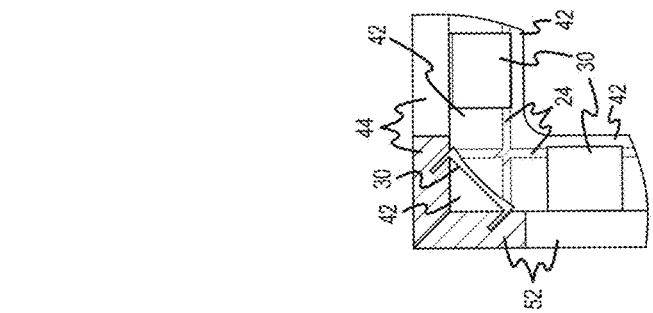
FIG. 3D is an enlarged view of section D of the modular unit of FIG. 3C.
Figure 3B:
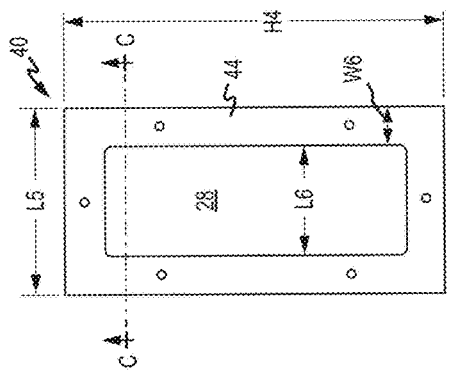
FIG. 3B is a front elevation view of the modular unit of FIG. 3A.

FIG. 3B is a front elevation view of the half cube 40 of FIG. 3A. Here, only the second rectangular side member 44 is visible. The frame-like shape of the rectangular side member 44 is also shown having a length L5 and a height H4. In one embodiment, the length L5 is between about 225 mm and about 325 mm. In a preferred embodiment, the length L5 is between about 250 mm and about 300 mm. In a more preferred embodiment, the length L5 is about 282 mm. In one embodiment, the height H4 is between about 450 mm and about 650 mm. In a preferred embodiment, the height H4 is between about 500 mm and about 600 mm. In a more preferred embodiment, the height H4 is about 564 mm. In one embodiment, the length L6 of the cutout 28 is between about 125 mm and about 225 mm. In a preferred embodiment, the length L6 of the cutout 28 is between about 150 mm and about 185 mm. In a more preferred embodiment, the length L6 of the cutout 28 is between about 165 mm and about 170 mm. The cutout 28 has rounded corners for ease of manufacturing and aesthetic purposes. The frame-like portion of the rectangular side member 44 is approximately the same width W6 around the entire side member 44 and approximately the same width W6 as the width of the frame-like portion of the large square side member (12, 14, 16, 18, 20, 22 in FIG. 2; 46, 52 in FIG. 3A). In one embodiment, the width W6 of the frame-like portion (of the rectangular side member and the large square side member) is between about 25 mm and about 100 mm. In a preferred embodiment, the width W6 of the frame-like portion is between about 40 mm and about 70 mm. In a more preferred embodiment, the width W6 of the frame-like portion is between about 53 mm and about 60 mm.

The measurements for the large square side member (12, 14, 16, 18, 20, 22 in FIG. 2; 46, 52 in FIG. 3A) are similar to the measurements of the rectangular side member 42, 44, 48, 50. The frame-like shape of the large square side member has a length that is substantially equal to its height. In one embodiment, the length and height of the large square side member are between about 450 mm and about 650 mm. In a preferred embodiment, the length and height of the large square side member are between about 500 mm and about 600 mm. In a more preferred embodiment, the length and height of the large square side member are about 564 mm.

FIG. 3C is a cross-sectional view of the half cube 40 of FIG. 3B taken along cut C-C. The inner surface of the first rectangular side member 42 includes a plurality of grooves 24. In the embodiment shown, the first rectangular side member 42 includes four groove 24, where each groove 24 is substantially parallel to an outer side or a perimeter edge of the side member 42 and substantially parallel to the perimeter edge of the cutout 28. The connectors 30 in the corners can be seen interconnecting the second rectangular side member 44 to the second large square side member 52, interconnecting the second rectangular side member 44 to the first large square side member 46, interconnecting the first large square side member 46 to the third rectangular side member 48, and interconnecting the third rectangular side member 48 to the second large square side member 52. Each connector 30 has a portion that is received by a groove 24 of one of the side members and a portion that is received by a groove 24 of the other side member interconnected thereto. Also shown in FIG. 3C are the connectors 30 interconnecting the top member or first rectangular side member 42 to each of the side members 44, 46, 48, 52 positioned perpendicular thereto. Specifically, one connector 30 interconnects the first rectangular side member 42 to the second rectangular side member 44, one connector 30 interconnects the first rectangular side member 42 to the third rectangular side member 48, two connectors 30 interconnect the first rectangular side member 42 to the first large square side member 46, and two connectors 30 interconnect the first rectangular side member 42 to the second large square side member 52.

FIG. 3D shows detail D of the half cube 40 cross section of FIG. 3C. The groove 24 and connectors 30 can be seen more clearly in FIG. 3D. The inner surface of the first rectangular side member 42 is visible here. The second rectangular side member 44 is positioned on top of a portion of the first rectangular side member 42. The cut portion of the second rectangular side member 44 is shown with hatch lines while the other portion of the second rectangular side member 44 visible is the cutout surface positioned perpendicular to the second rectangular side member's 44 inner and outer surfaces. The second large square side member 52 is positioned on top of a portion of the first rectangular side member 42. The cut portion of the second large square side member 52 is shown with hatch lines while the other portion of the second large square side member 52 visible is the cutout surface positioned perpendicular to the second large square side member's 52 inner and outer surfaces. One of the connectors 30 is interconnecting the second rectangular side member 44 to the second large square side member 52. Another connector 30 is interconnecting the second rectangular side member 44 to the first rectangular side member 42. The third connector 30 is interconnecting the second large square side member 52 to the first rectangular side member 42.

Figure 4:
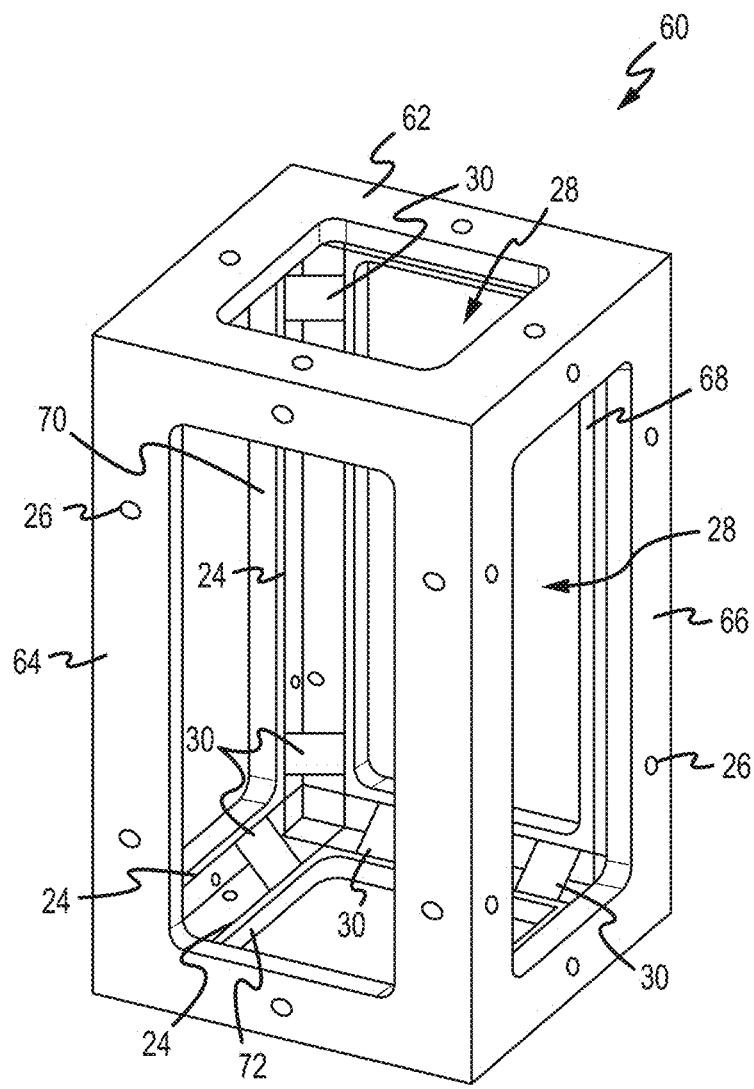
FIG. 4 depicts one embodiment of a modular unit or quarter cube.

FIG. 4 is a front perspective view of a modular unit or quarter cube 60. The quarter cube 60 comprises six side members: two small square side members 62, 72 and four rectangular side members 64, 66, 68, 70, where the short sides of the rectangular side members 64, 66, 68, 70 are the same length as the sides of the small square side members 62, 72. Additionally, each side member 62, 64, 66, 68, 70, 72 has a frame-like shape with a cutout 28 in the center of the side member 62, 64, 66, 68, 70, 72. The side members 62, 64, 66, 68, 70, 72 are assembled such that their outer surfaces are positioned on the outside of the modular unit 60 and the side members' 62, 64, 66, 68, 70, 72 inner surfaces are positioned on the inside of the modular unit 60. The grooves 24 in the side members 62, 64, 66, 68, 70, 72 are positioned on the inner surfaces of the side members 62, 64, 66, 68, 70, 72. One or more connectors 30 are positioned in each corner joint formed by the intersection of two side members 62, 64, 66, 68, 70, 72. Specifically, a portion of each connector 30 is positioned in one groove 24 of one side member 62, 64, 66, 68, 70, 72 and another portion of the connector 30 is positioned in one groove 24 of a different side member 62, 64, 66, 68, 70, 72. In the embodiment shown, only one connector 30 is used in a side joint of the shorter length and two connectors 30 are used in a side joint of the longer length. In other embodiments, more or fewer connectors 30 may be used in each side joint. Thus, the first small square side member 62 (also called the "top member") is interconnected on one side to a short side of the first rectangular side member 64, interconnected on another side to a short side of the second rectangular side member 66, interconnected on another side to a short side of the third rectangular side member 68, and interconnected on the final side to a short side of the fourth rectangular side member 70. A second small square side member 72 (also called the "bottom member") is positioned substantially parallel to and opposite the first small square side member 62. The second small square side member 72 is interconnected on one side to the other short side of the first rectangular side member 64, interconnected on another side to the other short side of the second rectangular side member 66, interconnected on another side to the other short side of the third rectangular side member 68, and interconnected on the final side to the other short side of the fourth rectangular side member 70. The first rectangular side member 64 is interconnected on one long side to one long side of the second rectangular side member 66 and interconnected on its opposite long side to a long side of the fourth rectangular side member 70. The third rectangular side member 68 is interconnected on one long side to the other long side of the second rectangular side member 66 and interconnected on its opposite long side to the other long side of the fourth rectangular side member 70. Each side member 62, 64, 66, 68, 70, 72 includes a plurality of apertures 26 for mounting items (such as floor surfaces, table surfaces, desk surfaces, pictures, wall surfaces, curtains, decorations, etc.) to the outer surface. Typically, a long side of a side member 64, 66, 68, 70 includes two apertures 26 and a short side of a side member 62, 64, 66, 68, 70, 72 includes one aperture 26. However, in alternative embodiments, the side members 62, 64, 66, 68, 70, 72 can have any number of apertures 26. In one embodiment, the apertures 26 (also called "through holes" herein) have a diameter between about 5.0 mm and about 20.0 mm. In a preferred embodiment, the apertures 26 have a diameter of about 12.70 mm. The apertures 26 may be threaded to receive threaded screws. In various embodiments, the apertures 26 are all the same size.

FIG. 5 is a front perspective view of a modular unit or an eighth cube 80. The embodiment shown comprises six side members 82, 84, 86, 88, 90, 92, all of which are the same size and are the small square shape (also called "small square side members"). Additionally, each side member 82, 84, 86, 88, 90, 92 has a frame-like shape with a cutout 28 in the center of the side member 82, 84, 86, 88, 90, 92. The side members 82, 84, 86, 88, 90, 92 are assembled such that their outer surfaces are positioned on the outside of the modular unit 80 and the side members' 82, 84, 86, 88, 90, 92 inner surfaces are positioned on the inside of the modular unit 80. The grooves 24 in the side members 82, 84, 86, 88, 90, 92 are positioned on the inner surfaces of the side members 82, 84, 86, 88, 90, 92. One or more connectors 30 are positioned in each corner joint formed by the intersection of two side members 82, 84, 86, 88, 90, 92. Thus, the first small square side member 82 (also called the "top member") is interconnected on one side to a side of the second small square side member 84, interconnected on another side to a side of the third small square side member 86, interconnected on another side to a side of the fourth small square side member 88, and interconnected on the final side to a side of the fifth small square side member 90. A sixth small square side member 92 (also called the "bottom member") is positioned substantially parallel to and opposite the first small square side member 82. The sixth small square side member 92 is interconnected on one side to a side of the second small square side member 84, interconnected on another side to a side of the third small square side member 86, interconnected on another side to a side of the fourth small square side member 88, and interconnected on the final side to a side of the fifth small square side member 90. The second small square side member 84 is interconnected on one side to one side of the third small square side member 86 and interconnected on its opposite side to one side of the fifth small square side member 90. The fourth small square side member 88 is interconnected on one side to one side of the third small square side member 86 and interconnected on its opposite side to one side of the fifth small square side member 90. Each side member 82, 84, 86, 88, 90, 92 includes a plurality of apertures 26 for mounting items (such as floor surfaces, table surfaces, desk surfaces, pictures, wall surfaces, curtains, decorations, etc.) to the outer surface. Each side of a side member 82, 84, 86, 88, 90, 92 includes one aperture 26. However, in alternative embodiments, the side members 82, 84, 86, 88, 90, 92 can have any number of apertures 26. In one embodiment, the apertures 26 (also called "through holes" herein) have a diameter between about 5.0 mm and about 20.0 mm. In a preferred embodiment, the apertures 26 have a diameter of about 12.70 mm. The apertures 26 may be threaded to receive threaded screws. In various embodiments, the apertures 26 are all the same size.

FIG. 6A is a top perspective view of one embodiment of a side member 600. The embodiment shown is a quarter-sized or small square side member 600. The outer surface 602 of the side member 600, one side surface 604, and two cutout surfaces 606A, 606B can be seen. The side member 600 is square-shaped and has an open center (i.e., cutout) 28 that is also square-shaped with rounded corners. The surfaces of the cutout (including the first cutout surface 606A and the second cutout surface 606B) are substantially perpendicular to the outer surface 602. The side member 600 has four sides that form a frame-like shape, each side having an angled side surface 604. The side member 600 has one aperture 26 extending from the outer surface 602 to the inner surface on each side of the frame. The side member 600 has an outer perimeter 610 comprising a first outer perimeter edge 610A, a second outer perimeter edge 610B, a third outer perimeter edge 610C, and a fourth outer perimeter edge 610D. The side member 600 also has an inner perimeter or a cutout edge 612 defining the cutout 28. The inner surface and side surfaces 604 include a plurality of grooves 24.

FIG. 6B is a top plan view of the small square side member 600 of FIG. 6A. The outer surface 602 of the side member 600 can be seen. In one embodiment the side member 600 has an outer perimeter 610 comprised of four edges (also called "outer perimeter edges") and an inner perimeter or a cutout edge 612 defining the cutout 28. The side member 600 has a height H1 that is substantially equal to its length L1. In one embodiment, the height H1 and length L1 are between about 200 mm and about 350 mm. In a preferred embodiment, the height H1 and length L1 are between about 250 mm and about 300 mm. In a more preferred embodiment, the height H1 and length L1 are about 282 mm. The side member has one aperture 26 on each side of the square frame extending from the outer surface 602 to the inner surface. In one embodiment, the apertures 26 have a diameter between about 5.0 mm and about 20.0 mm. In a preferred embodiment, the apertures 26 have a diameter of about 12.70 mm. The apertures 26 may be threaded to receive threaded screws. In various embodiments, the frame-like portion of the small square side member 600 is the same width as the frame-like portion of the large square side member and the rectangular side member (i.e., W6 in FIG. 3B).

FIG. 6C is a side elevation view of the side member 600 of FIG. 6A. The outer surface 602 is positioned opposite and substantially parallel to the inner surface 608. The side surfaces 604 are positioned at an angle relative to the inner surface 608 and outer surface 602. The side member 600 comprises at least two grooves 24 extending from the inner surface 608 toward, but not all the way to, the outer surface 602. The grooves 24 are positioned at an angle relative to the inner surface 608.

FIG. 6D is a side elevation view of detail D of the side member 600 of FIG. 6C. In one embodiment, the side member 600 has a width W1 of between about 10.0 mm and about 30.0 mm. In a preferred embodiment, the side member 600 has a width W1 of between about 15.0 mm and about 25.0 mm. In a more preferred embodiment, the side member 600 has a width W1 of about 19.05 mm. In one embodiment, the side surface 604 is at an angle A1 relative to the outer surface 602 between about 30 degrees and about 60 degrees. In a preferred embodiment, the angle A1 of the side surface 604 is between about 40 degrees and 50 degrees. In a more preferred embodiment, the angle A1 of the side surface 604 relative to the outer surface 602 is about 45 degrees. In one embodiment, the groove 24 is at an angle A2 relative to the inner surface 608 between about 20 degrees and about 70 degrees. In a preferred embodiment, the angle A2 of the groove 24 is between about 35 degrees and about 50 degrees. In a more preferred embodiment, the angle A2 of the groove 24 relative to the inner surface 608 is about 43 degrees. In one embodiment, the groove 24 has a width W2 of between about 2.0 mm and about 4.0 mm. In a preferred embodiment, the width W2 of the groove 24 is about 2.85 mm. The groove 24 is positioned a length L2 from the inner surface perimeter. In one embodiment, the length L2 is between about 15 mm and about 50 mm. In a preferred embodiment, the length L2 is about 30 mm. The groove 24 extends a length L3 into the side member as measured from the inner surface 608. In one embodiment, the length L3 is between about 5 mm and about 25 mm. In a preferred embodiment, the length L3 is about 9 mm.

Figure 6E:
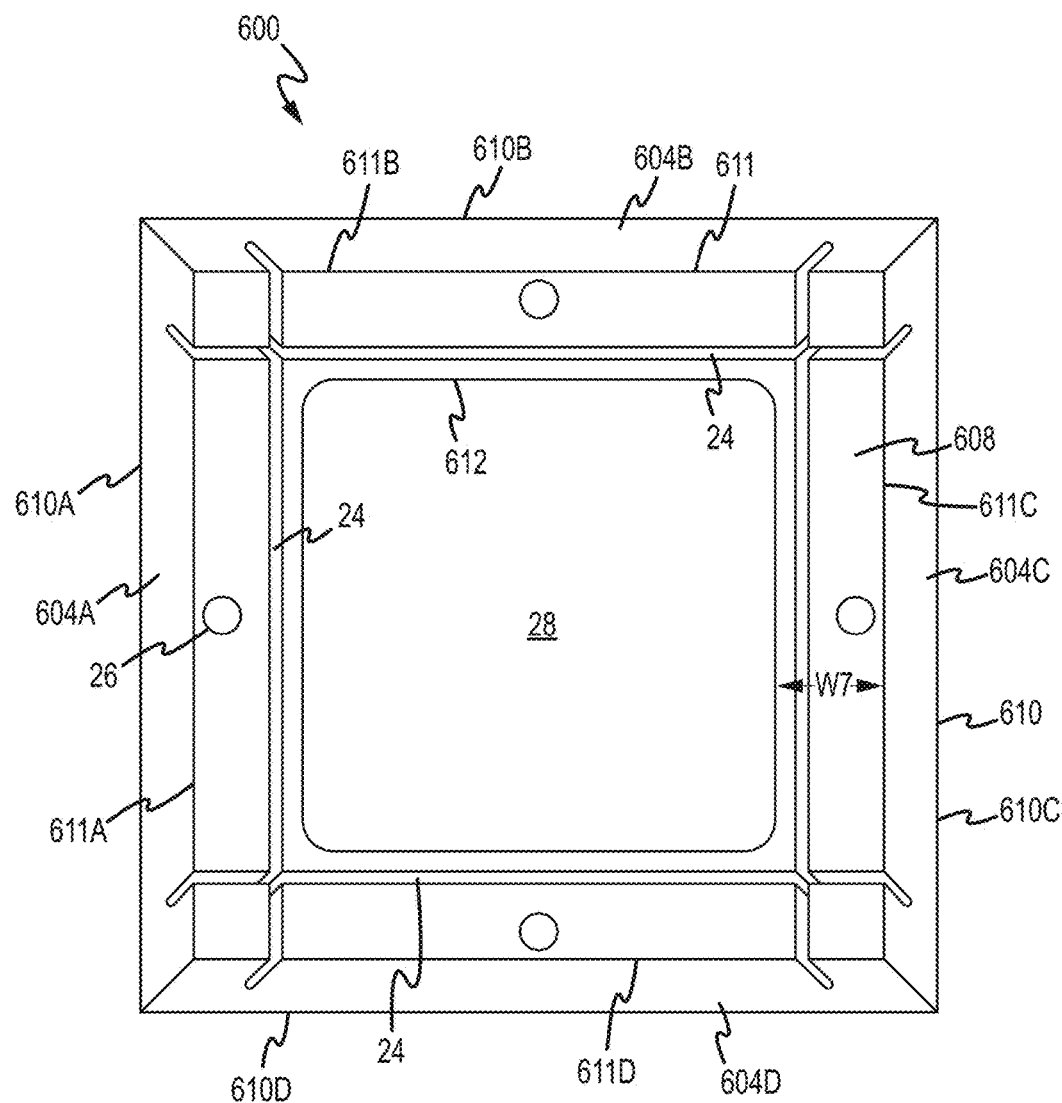

FIG. 6E is a bottom elevation view of the side member 600 of FIG. 6A. The side member 600 includes a cutout 28 defined by an inner perimeter or cutout edge 612. The inner surface 608 of the side member 600 extends from the inner perimeter or cutout edge 612 to the inner surface perimeter 611 a width W7. The inner surface perimeter 611 comprises a first inner surface perimeter edge 611A, a second inner surface perimeter edge 611B, a third inner surface perimeter edge 611C, and a fourth inner surface perimeter edge 611D. The inner surface 608 comprises a plurality of grooves 24, where each groove 24 is positioned substantially parallel to each cutout edge 612 and/or each inner surface perimeter edge 611A, 611B, 611C, 611D. The side surfaces 604A, 604B, 604C, 604D extend from the inner surface perimeter 611 outwardly and at an angle to the outer perimeter 610. Thus, the first side surface 604A is positioned between the first outer perimeter edge 610A and the first inner surface perimeter edge 611A. The second side surface 604B is positioned between the second outer perimeter edge 610B and the second inner surface perimeter edge 611B. The third side surface 604C is positioned between the third outer perimeter edge 610C and the third inner surface perimeter edge 611C. The fourth side surface 604D is positioned between the fourth outer perimeter edge 610D and the fourth inner surface perimeter edge 611D. The apertures 26 extend from the outer surface to the inner surface 608. Because the side surfaces 604 are positioned at an angle relative to the outer 602 and inner 608 surfaces, the inner surface 608 is smaller than the outer surface 602. In one embodiment, the width W7 of the inner surface 608 (i.e., from the cutout edge 612 to the inner surface perimeter 611) is between about 15 mm and about 60 mm. In a preferred embodiment, the width W7 is between about 25 mm and about 50 mm. In a more preferred embodiment, the width W7 is between about 34 mm and about 40 mm.

Figure 7:
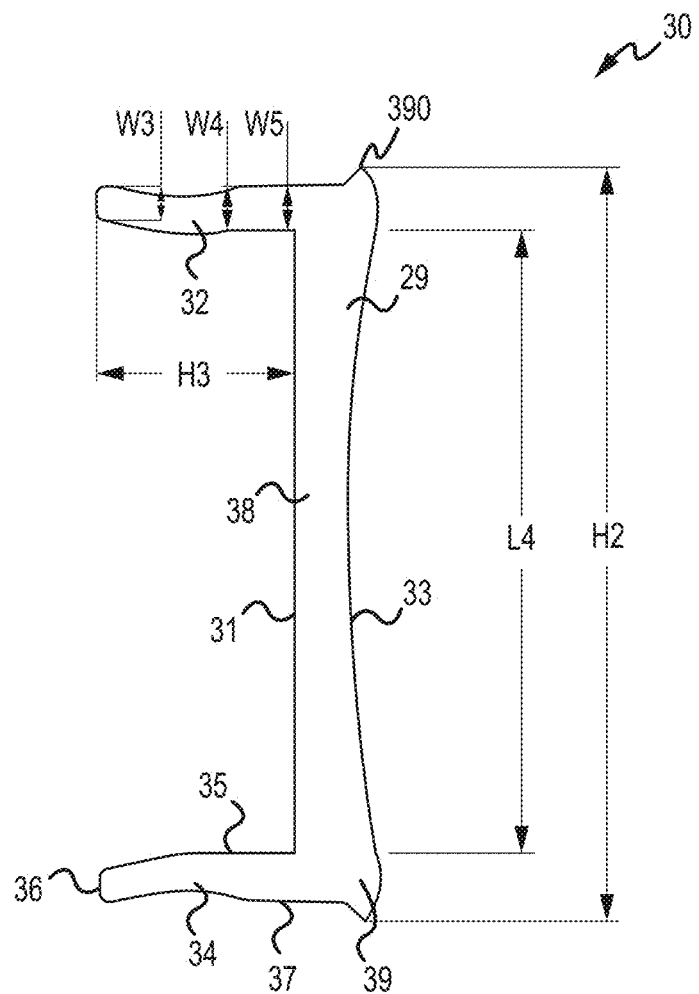
FIG. 7 is a side elevation view of one embodiment of a connector.

FIG. 7 is a side elevation view of one embodiment of a connector 30. The connector 30 comprises a first leg 32, a second leg 34, a flat inner surface 31, an outer surface 33, corners 39 with wings 390, a bridge portion 38, and two side surfaces 29 (only one side surface 29 is shown in FIG. 7). The outer surface 33 of the connector has an arcuate or curved shape when viewed from the side. Each leg 32, 34 has an inner surface 35 and an outer surface 37. Each leg 32, 34 also has a distal end 36, which may be flat, round, or flat with rounded edges. The corners 39 of the connector 30 are thicker than other portions of the connector 30 for increased strength. Further, the wings 390 of the corners 39 make the connector 30 more stable in side-to-side movement and assists a user in removing the connector 30 from the grooves of the side member. Additionally, the bridge portion 38 is thicker than the legs 32, 34 for added strength. The bridge portion 38 comprises a flat surface 31 for engaging the substantially flat cutout surfaces (606 of FIGS. 6A and 8) of the side members when interconnecting one modular unit to another modular unit.

In one embodiment, the height H2 of the connector 30 is between about 40 mm and about 50 mm. In a preferred embodiment, the height H2 of the connector 30 is about 46.25 mm. In one embodiment, the length L4 between the inner surfaces 35 of the legs 32, 34 of the connector 30 is between about 30 mm and about 45 mm. In a preferred embodiment, the length L4 between the inner surfaces 35 of the legs 32, 34 of the connector 30 is about 38.10 mm. In some embodiments, the length L4 is double the width W1 of the side members such that two side members positioned outer surface to outer surface fit between the legs 32, 34 of the connector 30 (see, e.g. FIG. 8). In one embodiment, the height H3 of the legs 32, 34 (i.e., from the distal end 36 of the leg 32, 34 to the flat inner surface 31) is between about 5.0 mm and about 20.0 mm. In a preferred embodiment, the height H3 of the connector 30 is about 12.05 mm. In one embodiment, the width W3 of the distal end 36 of the leg 32, 34 is between about 1.50 mm and about 3.00 mm. In a preferred embodiment, the width W3 of the distal end 36 of the leg 32, 34 is about 2.10 mm. In one embodiment, the width W4 of a middle portion of the leg 32, 34 is between about 1.50 mm and about 3.50 mm. In a preferred embodiment, the width W4 of the middle portion of the leg 32, 34 is about 2.76 mm. In one embodiment, the width W5 of the proximal end of the leg 32, 34 is between about 2.00 mm and about 3.50 mm. In a preferred embodiment, the width W5 of the proximal end of the leg 32, 34 is about 2.85 mm. Thus, the width W5 of the proximal end of the leg 32, 34 is larger than the width W4 of a middle portion of the leg 32, 34 and the width W3 of the distal end 36 of the leg 32, 34. Additionally, in some embodiments, the width W5 of the proximal end of the leg 32, 34 is approximately the same as the width W2 of the groove 24. The width of the leg 32, 34 gets smaller closer to the distal end 36 of the leg 32, 34 such that the legs 32, 34 can easily slide into the grooves of the side members. Thus, in some embodiments, the width W4 of a middle portion of the leg 32, 34 and the width W3 of the distal end 36 of the leg 32, 34 are smaller than the width W2 of the groove 24.

Figure 8:
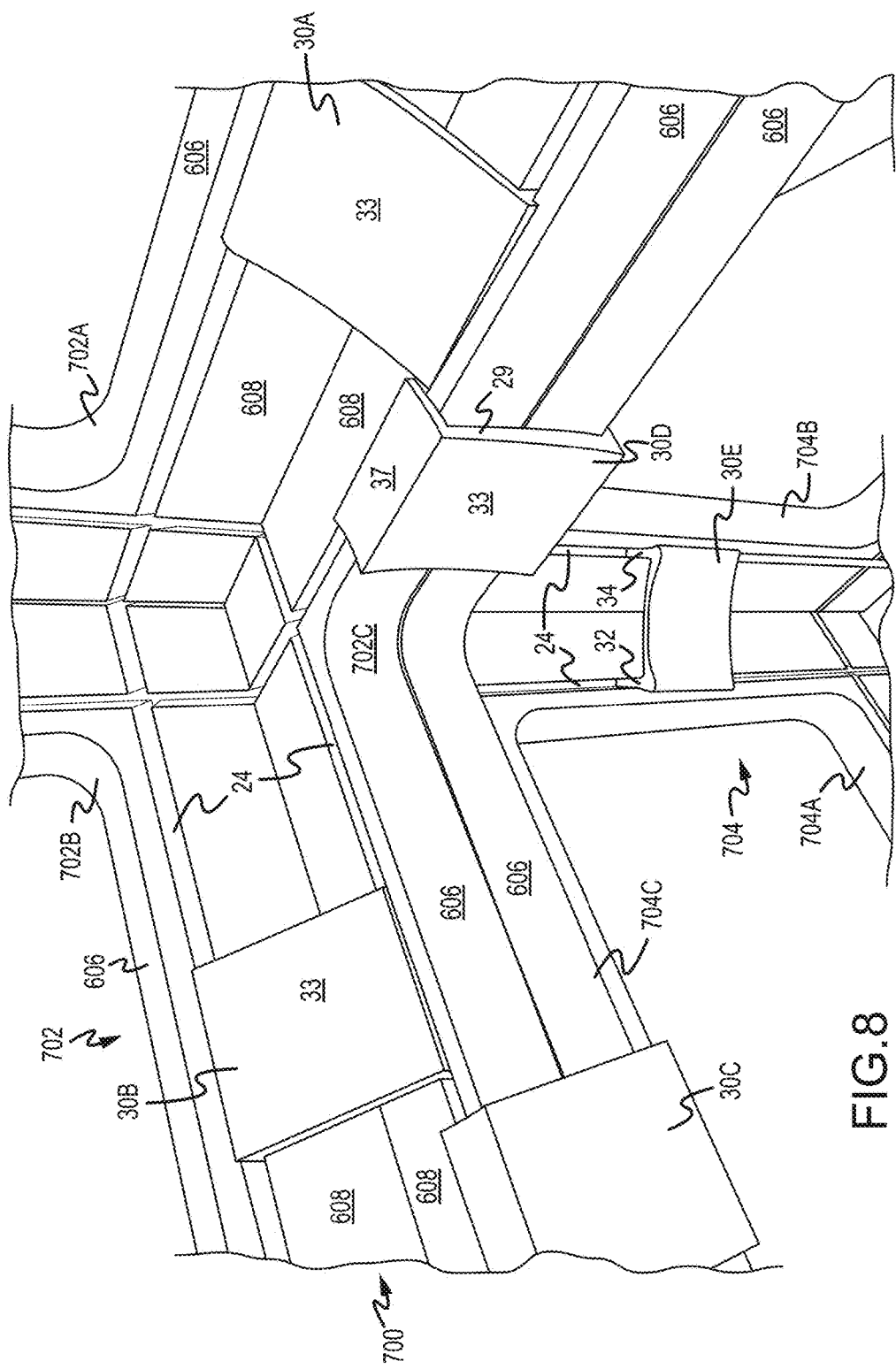
FIG. 8 shows two modular units interconnected via connectors.

FIG. 8 shows a system 700 of modular units 702, 704 interconnected to one another as viewed from within the system 700, meaning that the inner surfaces 608 of the side members are shown. The first modular unit 702 comprises a first side member 702A, a second side member 702B, and a third side member 702C. Additionally, the cutout surfaces 606 of the first, second, and third side members 702A, 702B, 702C are visible in this view. The first side member 702A is interconnected to the third side member 702C via a connector 30A, which has one leg positioned in a groove 24 of the first side member 702A and one leg positioned in a groove 24 of the third side member 702C. The outer surface 33 of the connector 30A is shown in FIG. 8. The first side member 702A is also interconnected to the second side member 702B via a connector (not shown). The second side member 702B is interconnected to the third side member 702C via a connector 30B, which has one leg positioned in a groove 24 of the second side member 702B and one leg positioned in a groove 24 of the third side member 702C. The outer surfaces 33 of the side members 30A, 30B, 30C, 30D, 30E have a rectangular shape when viewed from above.

The second modular unit 704 comprises a first side member 704A, a second side member 704B, and a third side member 704C. The first side member 704A is interconnected to the third side member 704C via a connector (not shown)

and the second side member 704B is interconnected to the third side member 704C via a connector (not shown). The first side member 704A is also interconnected to the second side member 704B via a connector 30E, which has one leg 32 positioned in a groove 24 of the first side member 704A and one leg 34 positioned in a groove 24 of the second side member 704B. The two modular units 702, 704 are interconnected to one another via connectors 30C, 30D. The connectors 30C, 30D interconnecting the two modular units 702, 704 are not positioned within the grooves 24 of the side members, while the connectors 30A, 30B, 30E interconnecting two side members of the same modular unit 702, 704 have a leg 32 positioned within a groove 24 of a first side member and a leg 34 positioned in a groove 24 of the second side member. Additionally, the connectors 30C, 30D interconnecting two modular units 702, 704 are actually interconnected to one side member 702C of the first modular unit 702 and one side member 704C of the second modular unit 704. Thus, the inner surface of one leg of the connector 30C, 30D is positioned on the inner surface 608 of one side member 702C and the inner surface of the second leg of the connector 30C, 30D is positioned on the inner surface of the other side member 704C. The flat inner surface (31 of FIG. 7) of the connector 30C, 30D is positioned on the cutout surfaces 606 of the side members 702C, 704C. Accordingly, the outer surface of one side member 702C of the first modular unit 702 is positioned adjacent to the outer surface of one side member 704C of the second modular unit 704.

The widths (W1 in FIG. 6D) of the various side members (large square side members, rectangular side members, and small square side members) are all substantially the same such that the various side members can be interconnected with different side members. Further, a first side member may be interconnected to a second side member at a first point in time and the first side member may be interconnected to a different side member at later point in time. In one embodiment, the side members have a width between about 10.0 mm and about 30.0 mm. In a preferred embodiment, the side members have a width between about 15.0 mm and about 25.0 mm. In a more preferred embodiment, the side members have a width of about 19.05 mm.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims. Further, the invention(s) described herein is capable of other embodiments and of being practiced or of being carried out in various ways. It is to be understood that the phraseology and terminology used herein is for the purpose of description and should not be regarded as limiting.

What is claimed is:

1. A modular furniture unit comprising:
   a first side member comprising:
   an outer surface having a surface area and an outer perimeter edge;
   an inner surface substantially parallel to the outer surface and having a surface area and an inner surface perimeter edge, wherein the surface area of the inner surface is smaller than the surface area of the outer surface;
   four sides, wherein each side has a side surface and each side surface extends from the outer perimeter edge to the inner surface perimeter edge at an angle between approximately 30 degrees and 60 degrees relative to the outer surface;
   a cutout defined by a cutout edge substantially parallel to the outer perimeter edge;
   four cutout surfaces positioned proximate the cutout edge and positioned substantially perpendicular to the outer surface; and
   four grooves in the inner surface, wherein each groove is positioned proximate to a portion of the cutout edge and is substantially parallel to the portion of the cutout edge;
   a second side member comprising:
   an outer surface having a surface area and an outer perimeter edge;
   an inner surface substantially parallel to the outer surface and having a surface area and an inner surface perimeter edge, wherein the surface area of the inner surface is smaller than the surface area of the outer surface;
   four sides, wherein each side has a side surface and each side surface extends from the outer perimeter edge to the inner surface perimeter edge at an angle between approximately 30 degrees and 60 degrees relative to the outer surface;
   a cutout defined by a cutout edge substantially parallel to the outer perimeter edge;
   four cutout surfaces positioned proximate the cutout edge and positioned substantially perpendicular to the outer surface; and
   four grooves in the inner surface, wherein each groove is positioned proximate to a portion of the cutout edge and is substantially parallel to the portion of the cutout edge; and
   a plurality of connectors, wherein each connector in the plurality of connectors comprises a first leg, a second leg, and a bridge portion positioned between the first leg and the second leg;
   wherein a first leg of a first connector in the plurality of connectors is positioned in a first groove of the four grooves of the first side member and a second leg of the first connector is positioned in a first groove of the four grooves of the second side member such that the first side member is interconnected to the second side member; and
   wherein a first side surface of a first side in the four sides of the first side member is positioned adjacent to a first side surface of a first side in the four sides of the second side member.

2. The modular furniture unit of claim 1, further comprising a third side member comprising:
   an outer surface having a surface area and an outer perimeter edge;
   an inner surface substantially parallel to the outer surface and having a surface area and an inner surface perimeter edge, wherein the surface area of the inner surface is smaller than the surface area of the outer surface;
   four sides, wherein each side has a side surface and each side surface extends from the outer perimeter edge to the inner surface perimeter edge at an angle between approximately 30 degrees and 60 degrees relative to the outer surface;
   a cutout defined by a cutout edge substantially parallel to the outer perimeter edge;
   four cutout surfaces positioned proximate the cutout edge and positioned substantially perpendicular to the outer surface; and four grooves in the inner surface, wherein each groove is positioned proximate to a portion of the cutout edge and is substantially parallel to the portion of the cutout edge.

3. The modular furniture unit of claim 2, wherein a first leg of a second connector in the plurality of connectors is positioned in a second groove of the four grooves of the second side member and a second leg of the second connector is positioned in a first groove of the four grooves of the third side member such that the second side member is interconnected to the third side member, and wherein a second side surface of a second side in the four sides of the second side member is positioned adjacent to a first side surface of a first side in the four sides of the third side member.

4. The modular furniture system of claim 3, further comprising a fourth side member comprising:
an outer surface having a surface area and an outer perimeter edge;
an inner surface substantially parallel to the outer surface and having a surface area and an inner surface perimeter edge, wherein the surface area of the inner surface is smaller than the surface area of the outer surface;
four sides, wherein each side has a side surface and each side surface extends from the outer perimeter edge to the inner surface perimeter edge at an angle between approximately 30 degrees and 60 degrees relative to the outer surface;
a cutout defined by a cutout edge substantially parallel to the outer perimeter edge;
four cutout surfaces positioned proximate the cutout edge and positioned substantially perpendicular to the outer surface; and
four grooves in the inner surface, wherein each groove is positioned proximate to a portion of the cutout edge and is substantially parallel to the portion of the cutout edge.

5. The modular furniture unit of claim 4, wherein a first leg of a third connector in the plurality of connectors is positioned in a second groove of the four grooves of the third side member and a second leg of the third connector is positioned in a first groove of the four grooves of the fourth side member such that the third side member is interconnected to the fourth side member, and wherein a second side surface of a second side in the four sides of the third side member is positioned adjacent to a first side surface of a first side in the four sides of the fourth side member.

6. The modular furniture unit of claim 5, wherein a first leg of a fourth connector in the plurality of connectors is positioned in a second groove of the four grooves of the fourth side member and a second leg of the fourth connector is positioned in a second groove of the four grooves of the first side member such that the fourth side member is interconnected to the first side member, and wherein a second side surface of a second side in the four sides of the fourth side member is positioned adjacent to a second side surface of a second side in the four sides of the first side member.

7. A modular furniture system comprising:
a plurality of modular units, wherein each modular unit in the plurality of modular units comprises:
a first side member including an outer surface having a surface area, an inner surface substantially parallel to the outer surface and having a surface area and an inner surface perimeter edge, a cutout, a perimeter edge, a cutout edge substantially parallel to the perimeter edge, four sides, four cutout surfaces, and four grooves in the inner surface, wherein each groove is positioned proximate to a portion of the perimeter edge and is substantially parallel to the portion of the perimeter edge, wherein each side has a side surface and each side surface extends from the perimeter edge to the inner surface perimeter edge at an angle between approximately 30 degrees and 60 degrees relative to the outer surface such that the surface area of the inner surface is smaller than the surface area of the outer surface;
a second side member including an outer surface having a surface area, an inner surface substantially parallel to the outer surface and having a surface area and an inner surface perimeter edge, a cutout, a perimeter edge, a cutout edge substantially parallel to the perimeter edge, four sides, four cutout surfaces, and four grooves in the inner surface, wherein each groove is positioned proximate to a portion of the perimeter edge and is substantially parallel to the portion of the perimeter edge, wherein each side has a side surface and each side surface extends from the perimeter edge to the inner surface perimeter edge at an angle between approximately 30 degrees and 60 degrees relative to the outer surface such that the surface area of the inner surface is smaller than the surface area of the outer surface; and
a first plurality of connectors, wherein each connector in the first plurality of connectors comprises a first leg, a second leg, and a bridge portion positioned between the first leg and the second leg;
wherein a first leg of a first connector in the first plurality of connectors is positioned in a first groove of the four grooves of the first side member and a second leg of the first connector is positioned in a first groove of the four grooves of the second side member such that the first side member is interconnected to the second side member;
wherein a first side surface of a first side in the four sides of the first side member is proximate to the first groove of the first side member, a first side surface of a first side in the four sides of the second side member is proximate to the first groove of the second side member, and the first side surface of the first side member is positioned adjacent to the first side surface of the second side member; and
a second plurality of connectors, wherein each connector in the second plurality of connectors interconnects one modular unit to another modular unit in the plurality of modular units.

8. The modular furniture system of claim 7, further comprising a top surface, wherein the top surface is positioned adjacent to at least one outer surface of one modular unit.

9. The modular furniture system of claim 7, wherein each modular unit in the plurality of modular units further comprises a third side member including an outer surface having a surface area, an inner surface substantially parallel to the outer surface and having a surface area and an inner surface perimeter edge, a cutout, a perimeter edge, a cutout edge substantially parallel to the perimeter edge, four sides, four cutout surfaces, and four grooves in the inner surface, wherein each groove is positioned proximate to a portion of the perimeter edge and is substantially parallel to the portion of the perimeter edge, wherein each side has a side surface and each side surface extends from the perimeter edge to the inner surface perimeter edge at an angle between approximately 30 degrees and 60 degrees relative to the outer surface such that the surface area of the inner surface is smaller than the surface area of the outer surface.

10. The modular furniture system of claim 9, wherein a first leg of a second connector in the first plurality of connectors is positioned in a second groove of the four grooves of the second side member and a second leg of the second connector is positioned in a first groove of the four grooves of the third side member such that the second side member is interconnected to the third side member, and wherein a second side surface of a second side in the four sides of the second side member is proximate to the second groove of the second side member, a first side surface of a first side in the four sides of the third side member is proximate to the first groove of the third side member, and the second side surface of the second side member is positioned adjacent to the first side surface of the third side member.

11. The modular furniture system of claim 9, wherein each modular unit in the plurality of modular units further comprises: a fourth side member including an outer surface having a surface area, an inner surface substantially parallel to the outer surface and having a surface area and an inner surface perimeter edge, a cutout, a perimeter edge, a cutout edge substantially parallel to the perimeter edge, four sides, four cutout surfaces, and four grooves in the inner surface, wherein each groove is positioned proximate to a portion of the perimeter edge and is substantially parallel to the portion of the perimeter edge, wherein each side has a side surface and each side surface extends from the perimeter edge to the inner surface perimeter edge at an angle between approximately 30 degrees and 60 degrees relative to the outer surface such that the surface area of the inner surface is smaller than the surface area of the outer surface.

12. The modular furniture system of claim 11, wherein a first leg of a third connector in the first plurality of connectors is positioned in a second groove of the four grooves of the third side member and a second leg of the third connector is positioned in a first groove of the four grooves of the fourth side member such that the third side member is interconnected to the fourth side member, and wherein a second side surface of a second side in the four sides of the third side member is proximate to the second groove of the third side member, a first side surface of a first side in the four sides of the fourth side member is proximate to the first groove of the fourth side member, and the second side surface of the third side member is positioned adjacent to the first side surface of the fourth side member.

13. The modular furniture system of claim 12, wherein a first leg of a fourth connector in the first plurality of connectors is positioned in a second groove of the four grooves of the fourth side member and a second leg of the fourth connector is positioned in a second groove of the four grooves of the first side member such that the fourth side member is interconnected to the first side member, and wherein a second side surface of a second side in the four sides of the fourth side member is proximate to the second groove of the fourth side member, a second side surface of a second side in the four sides of the first side member is proximate to the second groove of the first side member, and the second side surface of the fourth side member is positioned adjacent to the second side surface of the first side member.

14. A method of arranging a modular furniture system comprising:
providing a plurality of modular units, wherein each modular unit in the plurality of modular units comprises:

a plurality of side members, wherein each side member comprises an outer surface having an outer surface area, an inner surface substantially parallel to the outer surface and having an inner surface area and an inner surface perimeter edge, a cutout, a perimeter edge, a cutout edge substantially parallel to the perimeter edge, four sides, four cutout surfaces, and four grooves in the inner surface, wherein each groove is positioned proximate to a portion of the perimeter edge and is substantially parallel to the portion of the perimeter edge, wherein each side has a side surface and each side surface extends from the perimeter edge to the inner surface perimeter edge at an angle between approximately 30 degrees and 60 degrees relative to the outer surface such that the inner surface area is smaller than the outer surface area; and a plurality of connectors, wherein each connector in the plurality of connectors comprises a first leg, a second leg, and a bridge portion positioned between the first leg and the second leg;

arranging a first modular unit in the plurality of modular units;

arranging a second modular unit in the plurality of modular units proximate to the first modular unit; and interconnecting the first modular unit to the second modular unit comprising:
positioning an outer surface of a first side member in the plurality of side members of the first modular unit adjacent to an outer surface of a first side member in the plurality of side members of the second modular unit; and frictionally engaging a connector in the plurality of connectors to the first side member of the first modular unit and the first side member of the second modular unit such that a flat surface of a bridge portion of the connector is positioned adjacent to a first cutout surface of the first side member of the first modular unit and a first cut out surface of the first side member of the second modular unit, and wherein an inner surface of a first leg of the connector is positioned adjacent to an inner surface of the first side member of the first modular unit and an inner surface of a second leg of the connector is positioned adjacent to an inner surface of the first side member of the second modular unit.

15. The method of arranging a modular furniture system of claim 14, wherein the step of assembling the first modular unit comprises:
positioning a first side surface of a first side member in the plurality of side members adjacent to a first side surface of a second side member in the plurality of side members such that the inner surface of the first side member and an inner surface of the second side member are positioned toward a center of the first modular unit;

inserting a first leg of a first connector in the plurality of connectors into a first groove of the four grooves of the first side member;

inserting a second leg of the first connector into a first groove of the four grooves of the second side member such that the first side member is interconnected to the second side member;

positioning a second side surface of the second side member adjacent to a first side surface of a third side member in the plurality of side members such that the inner surface of the second side member and an inner surface of the third side member are positioned toward the center of the first modular unit;

inserting a first leg of a second connector in the plurality of connectors into a second groove of the four grooves of the second side member;

inserting a second leg of the second connector into a first groove of the four grooves of the third side member such that the second side member is interconnected to the third side member;

positioning a second side surface of the third side member adjacent to a first side surface of a fourth side member in the plurality of side members such that the inner surface of the third side member and an inner surface of the fourth side member are positioned toward the center of the first modular unit;

inserting a first leg of a third connector in the plurality of connectors into a second groove of the four grooves of the third side member;

inserting a second leg of the third connector into a first groove of the four grooves of the fourth side member such that the third side member is interconnected to the fourth side member;

positioning a second side surface of the fourth side member adjacent to a second side surface of the first side member such that the inner surface of the fourth side member and the inner surface of the first side member are positioned toward the center of the first modular unit;

inserting a first leg of a fourth connector in the plurality of connectors into a second groove of the four grooves of the fourth side member; and inserting a second leg of the fourth connector into a second groove of the four grooves of the first side member such that the fourth side member is interconnected to the first side member.

* * * * *